United States Patent
Grinnell et al.

(10) Patent No.: US 10,772,291 B2
(45) Date of Patent: Sep. 15, 2020

(54) PORTABLE PET FEEDER AND SUPPLY STORAGE APPARATUS

(71) Applicants: Rolane Christian Grinnell, Brianhead, UT (US); John Derrick Anderson, St. George, UT (US)

(72) Inventors: Rolane Christian Grinnell, Brianhead, UT (US); John Derrick Anderson, St. George, UT (US)

(*) Notice: Subject to any disclaimer, the term of this patent is extended or adjusted under 35 U.S.C. 154(b) by 334 days.

(21) Appl. No.: 15/650,331

(22) Filed: Jul. 14, 2017

(65) Prior Publication Data

US 2018/0014504 A1 Jan. 18, 2018

Related U.S. Application Data

(60) Provisional application No. 62/362,513, filed on Jul. 14, 2016.

(51) Int. Cl.
| | |
|---|---|
| *A01K 5/01* | (2006.01) |
| *A01K 7/00* | (2006.01) |
| *A45C 13/02* | (2006.01) |
| *A01K 27/00* | (2006.01) |
| *A45F 3/02* | (2006.01) |
| *A45C 13/00* | (2006.01) |
| *A01K 5/00* | (2006.01) |

(52) U.S. Cl.
CPC .......... *A01K 5/0114* (2013.01); *A01K 5/0107* (2013.01); *A01K 5/0135* (2013.01); *A01K 7/005* (2013.01); *A01K 5/008* (2013.01); *A01K 27/003* (2013.01); *A45C 13/005* (2013.01); *A45C 13/008* (2013.01); *A45C 2013/026* (2013.01); *A45F 3/02* (2013.01)

(58) Field of Classification Search
CPC .. A01K 5/0114; A01K 5/0107; A01K 5/0135; A01K 5/008; A01K 7/005; A01K 27/003; A45C 2013/026; A45C 2013/008; A45C 2013/005; A45F 3/02
See application file for complete search history.

(56) References Cited

U.S. PATENT DOCUMENTS

| | | |
|---|---|---|
| 1,017,590 A | 2/1912 | Rice |
| 2,301,050 A | 11/1942 | Kelley |

(Continued)

*Primary Examiner* — Joshua D Huson
(74) *Attorney, Agent, or Firm* — Gurr Brande & Spendlove, PLLC; Robert A. Gurr

(57) ABSTRACT

A portable pet feeder and supply storage apparatus has a first compartment having a base and sidewalls defining a first open space; a second compartment having a lid and sidewalls defining a second open space; a divider interposed between the first and second compartments, wherein the second compartment and the divider are hinged to the first compartment, the divider has a gasket; wherein the second compartment and the divider may be pivoted towards the first compartment to assume a closed position, the gasket on the divider providing a water-tight seal between the first compartment and the divider; a water dish and a food dish both removably insertable within the first open space; at least one removable container receivable within the second open space, the removable container configured to be refillable and water-tight; and wherein the second compartment and the divider are removably attachable to the first compartment.

7 Claims, 38 Drawing Sheets

(56) References Cited

U.S. PATENT DOCUMENTS

| | | | | |
|---|---|---|---|---|
| 2,672,232 A | * | 3/1954 | Kessell, Jr. | A45C 11/20 206/543 |
| 3,730,141 A | | 5/1973 | Manning | |
| 3,915,097 A | | 10/1975 | Young, Jr. | |
| 4,932,361 A | | 6/1990 | Deutsch | |
| 5,129,361 A | | 7/1992 | Deutsch | |
| 5,299,529 A | | 4/1994 | Ramirez | |
| 5,560,321 A | * | 10/1996 | Hess | A01K 27/006 119/858 |
| 5,755,180 A | * | 5/1998 | Smith | A01K 13/00 119/165 |
| 5,823,136 A | | 10/1998 | Zarski | |
| 5,947,056 A | * | 9/1999 | Zarski | A01K 7/00 119/61.56 |
| 6,401,954 B1 | | 6/2002 | Gamble | |
| 6,863,025 B2 | | 3/2005 | Ness | |
| 6,874,445 B2 | | 4/2005 | Polimeni, Jr. | |
| 7,040,249 B1 | | 5/2006 | Mushen | |
| 7,077,074 B2 | | 7/2006 | Polimeni, Jr. | |
| 7,198,005 B2 | | 4/2007 | Polimeni, Jr. | |
| 2,538,391 A1 | | 5/2007 | Fick | |
| 7,578,261 B2 | | 8/2009 | Fick | |
| 8,997,690 B2 | | 4/2015 | Jones | |
| 9,629,432 B2 | * | 4/2017 | Edwards | A45C 11/20 |
| 9,908,938 B2 | | 3/2018 | Koenig et al. | |
| 10,251,369 B1 | * | 4/2019 | Rozsa | A01K 1/029 |
| 2002/0083900 A1 | | 7/2002 | Williams | |
| 2003/0019434 A1 | | 1/2003 | Spires et al. | |
| 2003/0026876 A1 | * | 2/2003 | Albuja | A01K 5/0114 426/120 |
| 2005/0109776 A1 | * | 5/2005 | Camp, Jr. | A45C 11/20 220/23.86 |
| 2006/0278169 A1 | | 12/2006 | Logan | |
| 2006/0288953 A1 | * | 12/2006 | Bottorff | A01K 1/035 119/497 |
| 2008/0308044 A1 | | 12/2008 | Tiemann | |
| 2009/0064938 A1 | | 3/2009 | Or | |
| 2010/0043721 A1 | | 2/2010 | Cigan | |
| 2010/0219196 A1 | | 9/2010 | Alvino | |
| 2011/0114025 A1 | | 5/2011 | McMurphy | |
| 2011/0121002 A1 | * | 5/2011 | Stiller | A45C 11/20 220/504 |
| 2015/0335119 A1 | * | 11/2015 | Baker | A45C 11/20 206/545 |
| 2016/0037886 A1 | * | 2/2016 | Edwards | A45C 11/20 206/545 |
| 2017/0137205 A1 | * | 5/2017 | Graf | A45C 11/20 |

\* cited by examiner

SECTION A-A

PORTABLE PET FEEDER AND SUPPLY STORAGE APPARATUS

CROSS-REFERENCE TO RELATED APPLICATIONS

This application claims the benefit of U.S. Provisional Application Ser. No. 62/362,513, filed on Jul. 14, 2016, which is incorporated herein by reference.

TECHNICAL FIELD

This disclosure relates generally to the field of pet care. More particularly, the present disclosure relates to portable apparatuses for pet feeding and storing supplies.

BACKGROUND

A large population of people today have dogs, cats, or other pets. A common difficulty faced by pet owners is the ability to easily carry food, water, and other supplies for the pet when travelling. Because animals typically drink out of an open container, it is usually necessary for a person to carry a bowl or other open container for the animal to eat and drink from. Leaving food and water in such a bowl is not ideal, as it will usually spill when in a vehicle. As such, while some foods may be repackaged, any remaining liquid must be discarded to avoid spills. Constantly refilling the bowl is not only burdensome, it also requires the person to carry inordinate amounts of foods and liquids. In other instances, the person may not have a bowl for use while travelling, which makes it difficult to adequately feed and water the animal.

Further, pets may accompany owners on walks, hikes, or other activities. In such an instance, both the person and the animal will usually need water for hydration. This requires the owner to carry separate containers for transporting liquid (e.g., sealable) and for hydrating the animal (e.g., a bowl). Again, the pet may not drink all of the water placed in the bowl by the owner, requiring the owner to discard any remaining water in the bowl before continuing. What's more, pets may experience a bowl movement while on the hike, with the owner needing a waste bag to discard of the excrement. In addition, if the animal requires additional medication or suffers an injury, it may be difficult to adequately care for the animal.

Attempts have been made in the prior art to solve some of these needs. For example, U.S. Pat. No. 7,578,261 to Fick and U.S. Pat. No. 6,874,445 to Polimeni both disclose apparatuses for feeding pets. However, the '445 patent requires that liquid be removed from the bowl before transporting, and the '261 patent requires a separate apparatus for food and water, which fails to solve several, if not all, of the problems described above.

Further, pets are in need of more supplies than food and water. For example, many pets require medication, wound care, or other needs. Still further is the desire of the person to have additional accessories, such as waste bags for the collection and disposal of animal excrement.

Therefore, despite attempts in the prior art, there remains a need for a portable storage device for pet supplies, including the ability to carry food, water, and other accessories. The present disclosure seeks to solve these and other problems.

SUMMARY OF EXAMPLE EMBODIMENTS

In one embodiment, a portable pet feeder and supply storage apparatus comprises a first compartment having a base and sidewalls defining a first open space; a second compartment having a lid and sidewalls defining a second open space; a divider interposed between the first and second compartments, wherein the second compartment and the divider are hinged to the first compartment, the divider having a gasket; wherein the second compartment and the divider may be pivoted towards the first compartment to assume a closed position, the gasket on the divider providing a water-tight seal between the first compartment and the divider; a water dish and a food dish both removably insertable within the first open space; at least one removable container receivable within the second open space, the removable container configured to be refillable and water-tight; and wherein the second compartment and the divider are removably attachable to the first compartment.

The portable pet feeder and supply storage apparatus may further comprise a housing insert and a lid insert, the housing insert configured to be nestable within the first compartment, the housing insert comprising a water dish opening and a food dish opening for receiving the water dish and food dish, the portable pet feeder and supply storage apparatus further comprising two bowls, each having a removable lid, each bowl being removably insertable within the water dish opening and food dish opening and configured so that when nested within the food dish opening and the water dish opening, the food dish and water dish may be received within the food dish opening and water dish opening, the food dish and water dishes resting on the lids of the bowls; the food dish and water dish having a rim for resting in a groove around the circumference of the food dish opening and water dish opening so that the food dish and water dish nest flush with the housing insert, the groove having a gasket therein. The lid insert configured to be nestable within the second compartment, the lid insert comprising at least one opening for receiving the removable container, the lid insert being securable to the second compartment.

DETAILED DESCRIPTION OF EXAMPLE EMBODIMENTS

Figure 1:
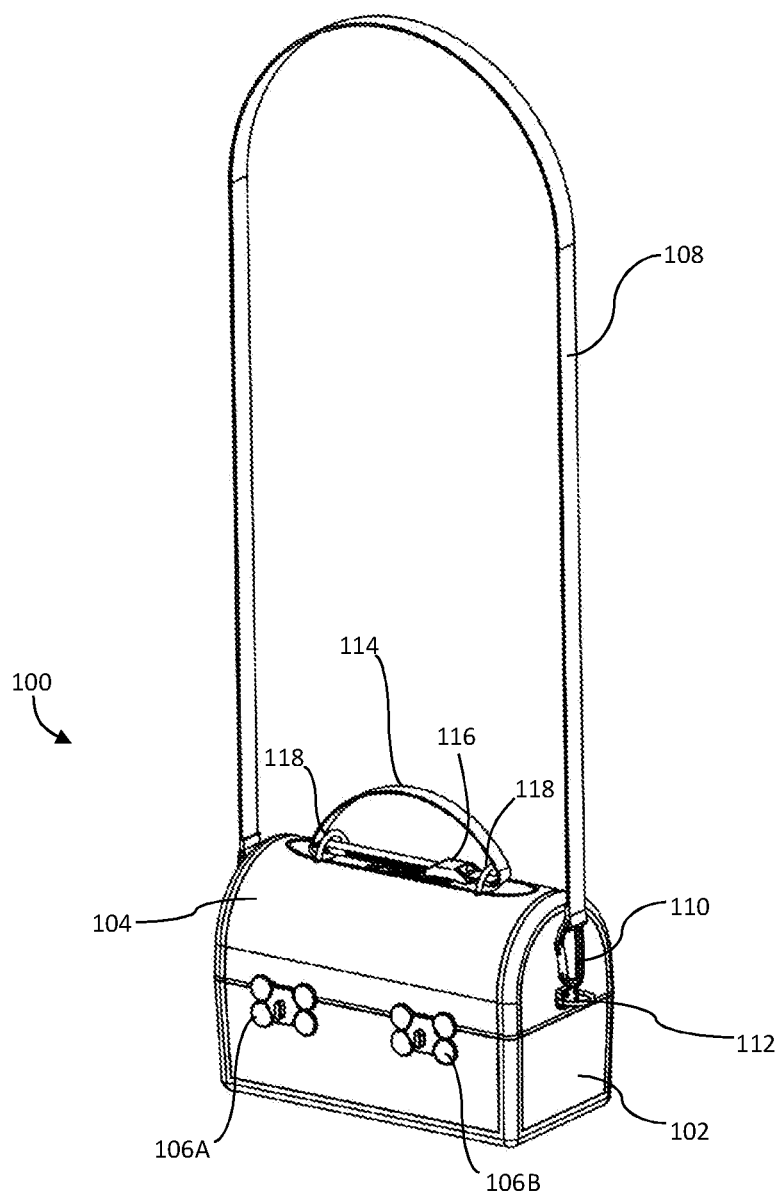
FIG. 1 is a perspective view of a portable pet feeder and supply storage apparatus in a closed configuration.
Figure 2:
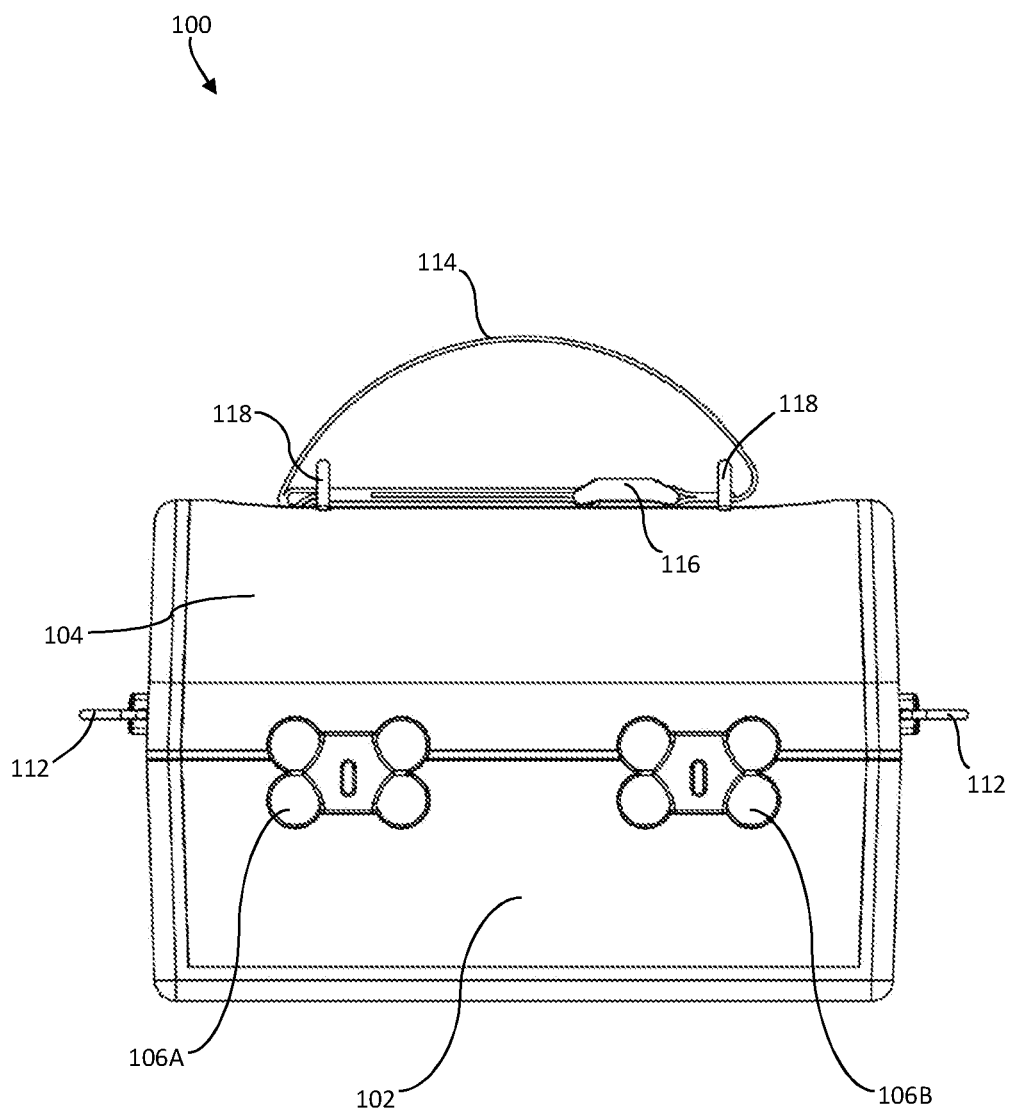
FIG. 2 is a front elevation view of a portable pet feeder and supply storage apparatus in a closed configuration.
Figure 3:
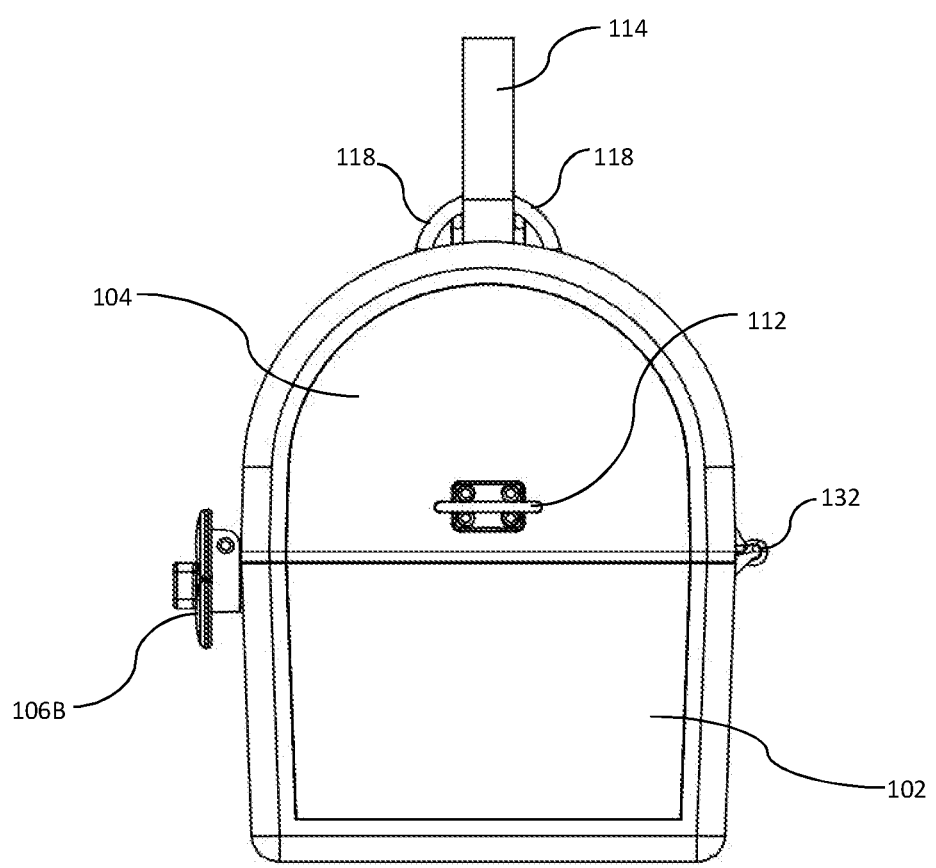
FIG. 3 is a side elevation view of a portable pet feeder and supply storage apparatus in a closed configuration.
Figure 4:
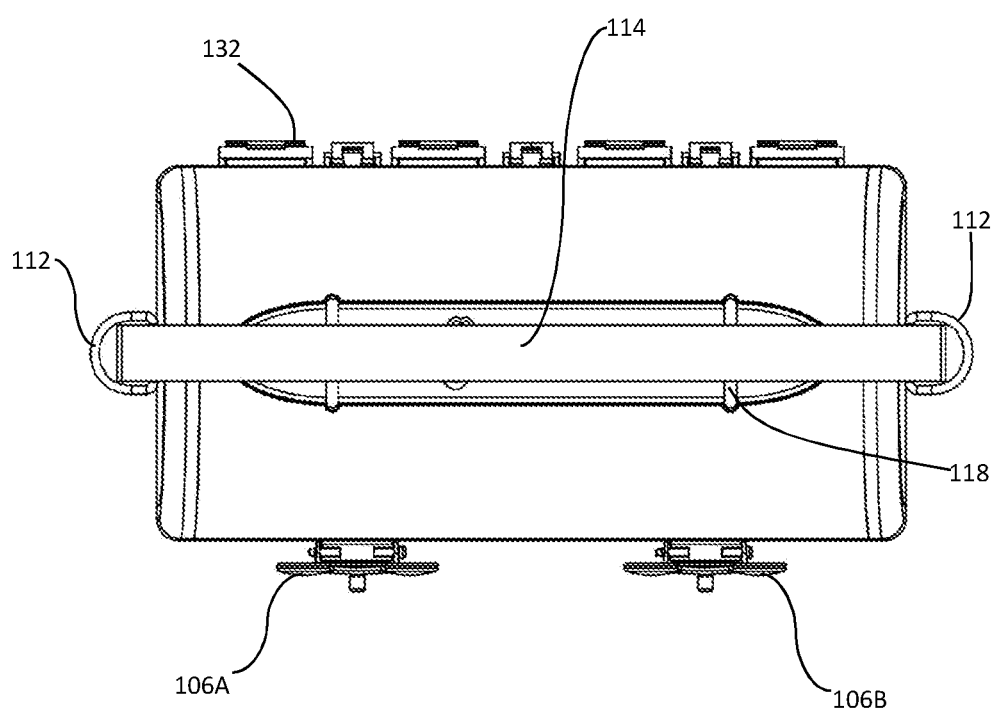
FIG. 4 is a top plan view of a portable pet feeder and supply storage apparatus in a closed configuration.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a portable storage device for pet supplies, including the ability to carry food, water, and other accessories. The portable pet feeder and supply storage apparatus disclosed herein solves these needs and others.

Referring now to the Figures, FIGS. 1-4 illustrate various external views of a portable pet feeder and supply storage apparatus 100 in a closed configuration. In one embodiment, the portable pet feeder and supply storage apparatus 100 comprises a first compartment 102 and a second compartment 104. As illustrated in FIGS. 1-4, the first compartment 102 and the second compartment 104 may be in a closed configuration, whereby the first compartment 102 is secured to the second compartment 104 using one or more latches 106A and 106B. However, it will be appreciated that any securing mechanism may be used, such as buckles, straps, snaps, or equivalent. A shoulder strap 108 may be coupled to the sidewalls of either the first or second compartments, 102, 104 respectively. The shoulder strap 108 may be coupled using a carabiner 110 and a plurality of loops 112 or equivalent means allowing the shoulder strap 108 to be removably attachable. As such, the shoulder strap 108 may likewise function as a leash for an animal. Further, a handle 114 may likewise be removable (e.g., buckle 116) such that the handle 114 may be used as a collar for an animal. In other words, collar/handle 114 may pass through one or more loops 118 and be secured using buckle 116. When needed, a user may simply release the buckle 116 and slide the handle 114 from the loops 118, allowing the handle 114 to function as a collar. This configuration adds several benefits. For example, owners of pets may misplace a leash, or even a collar, when not used with a dog. By providing loops 112 or other mechanism for coupling the leash as a shoulder strap 108 and the collar as a handle 114, the odds of misplacing or losing those items is significantly reduced. Further, when the portable pet feeder and supply storage apparatus 100 is used by emergency personnel or animal rescuers, the rescued animal may not have a collar or leash. As such, emergency personnel may use the collar and leash provided on the portable pet feeder and supply storage apparatus 100.

Figure 5:
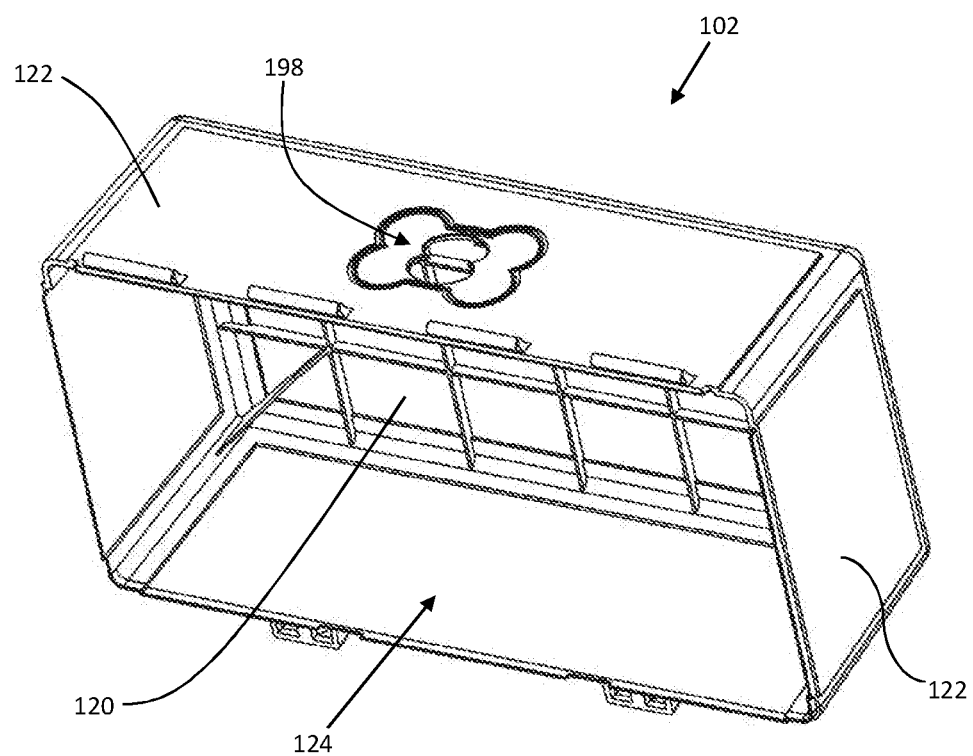
FIG. 5 is a perspective view of a first compartment of a portable pet feeder and supply storage apparatus.
Figure 6:
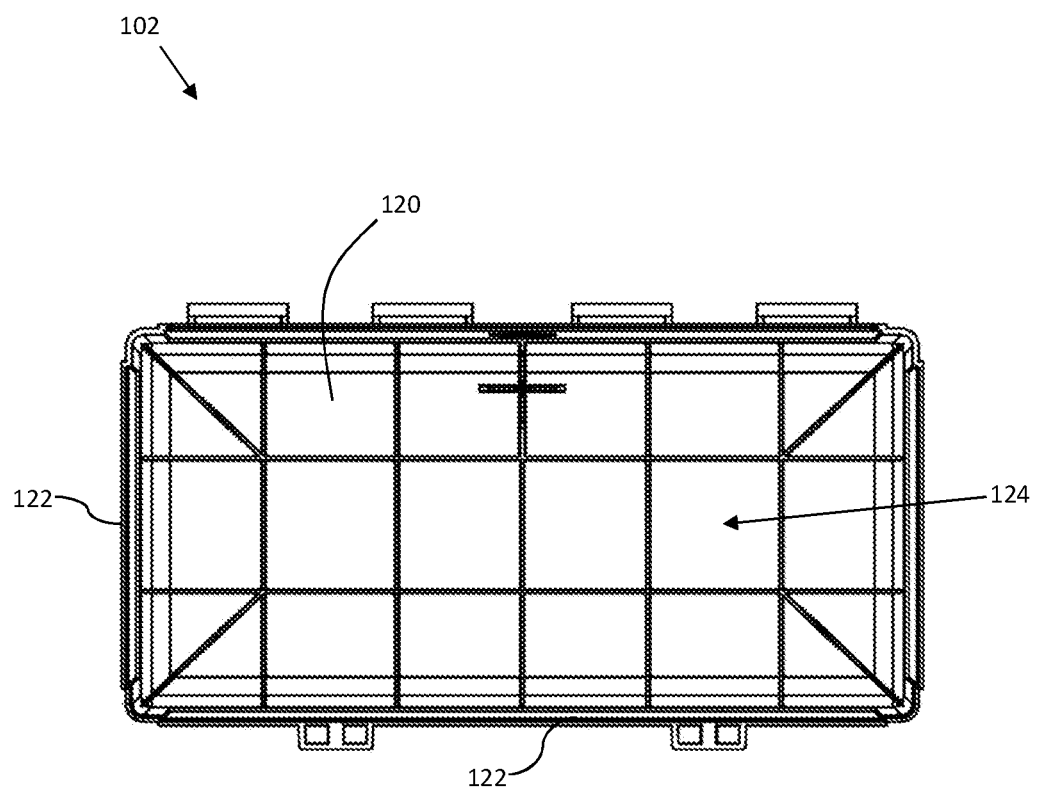
FIG. 6 is a top, inside view of a first compartment of a portable pet feeder and supply storage apparatus.
Figure 7:
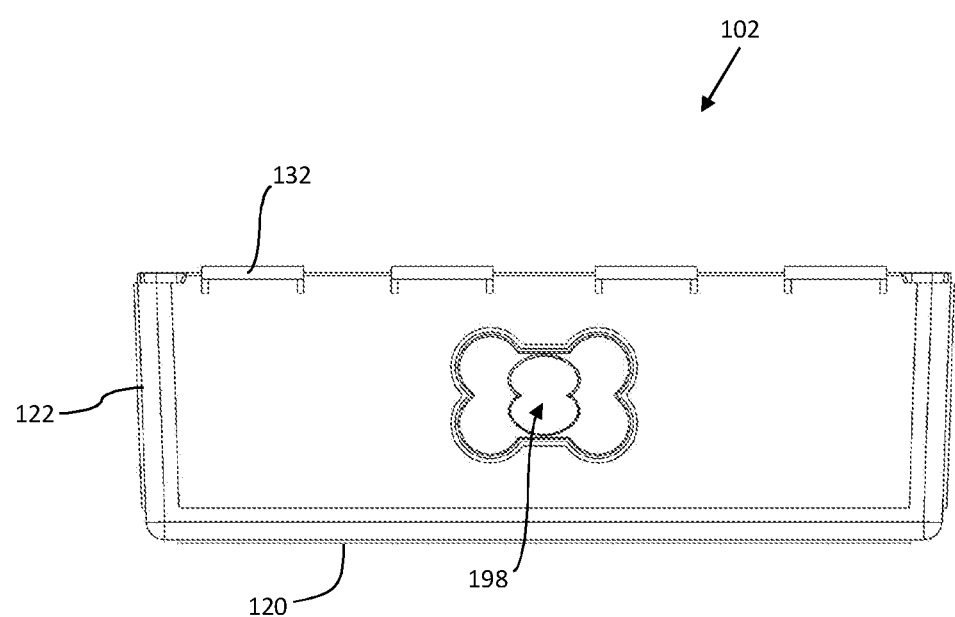
FIG. 7 is a rear elevation view of a first compartment of a portable pet feeder and supply storage apparatus.
Figure 8:
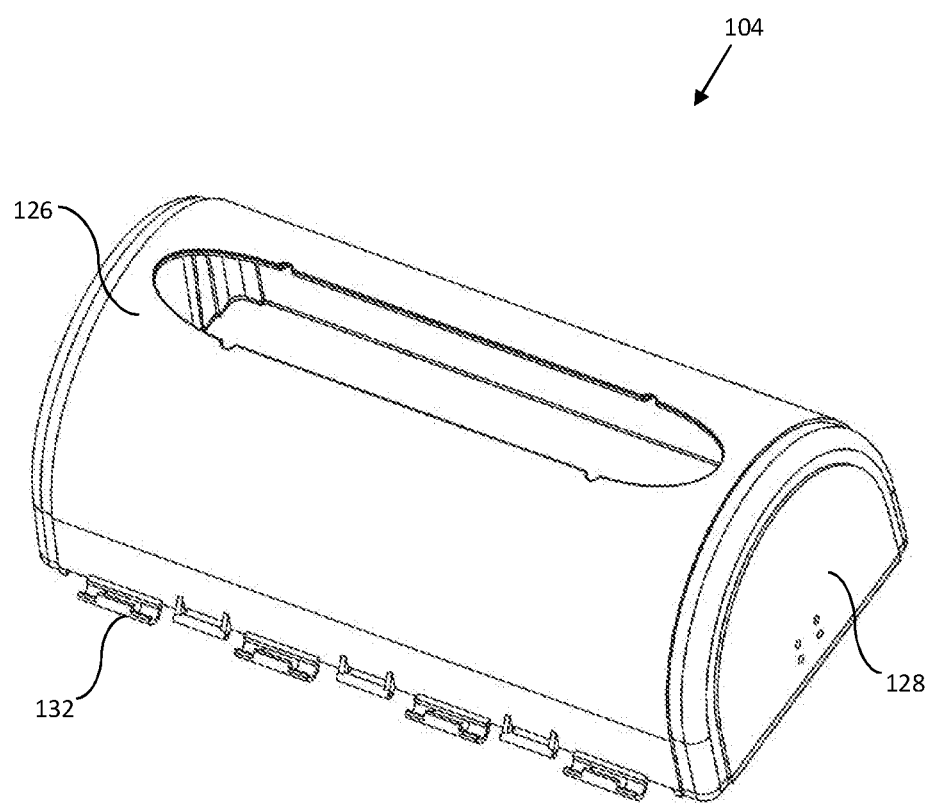
FIG. 8 is a perspective view of a second compartment of a portable pet feeder and supply storage apparatus.
Figure 9:
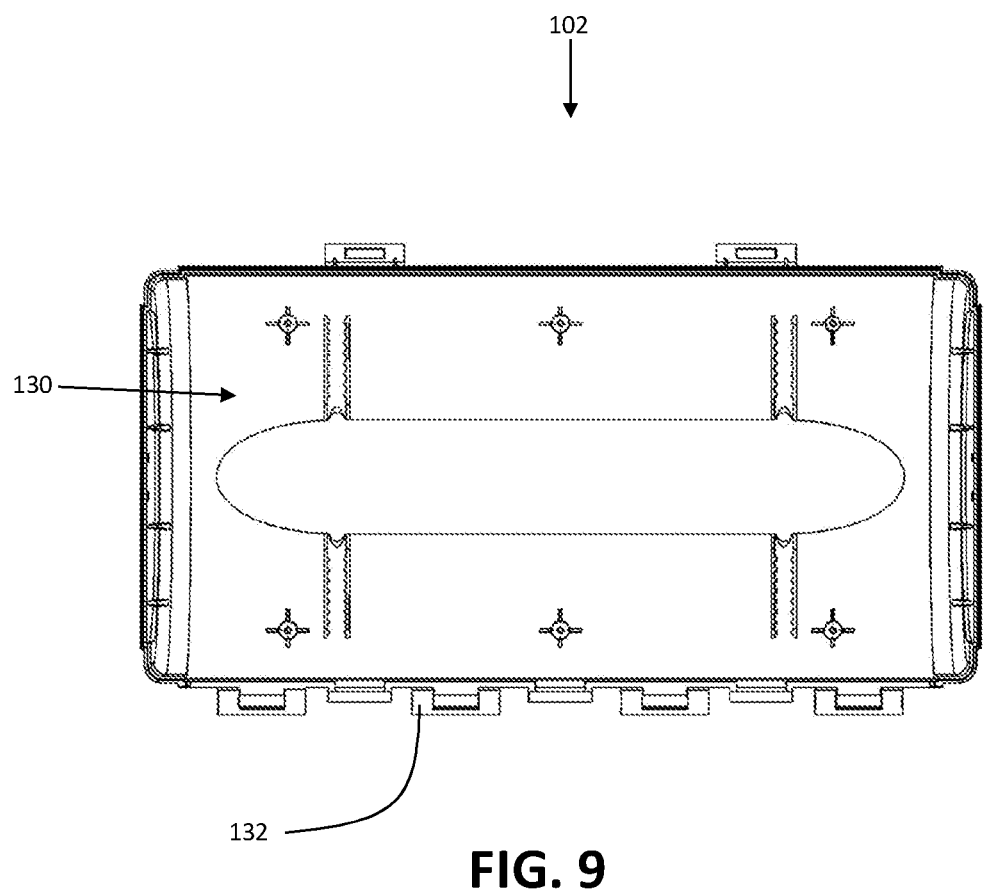
FIG. 9 is a top, inside view of a first compartment of a portable pet feeder and supply storage apparatus.
Figure 10:
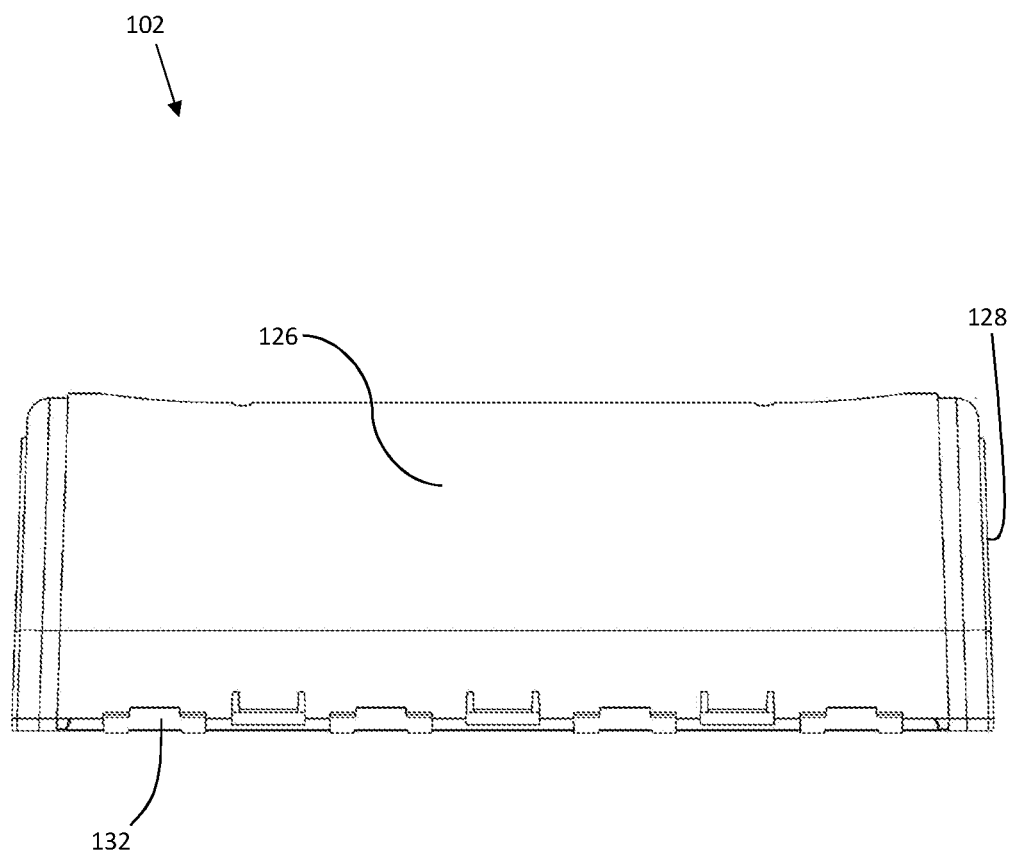
FIG. 10 is a rear elevation view of a first compartment of a portable pet feeder and supply storage apparatus.
Figure 11:
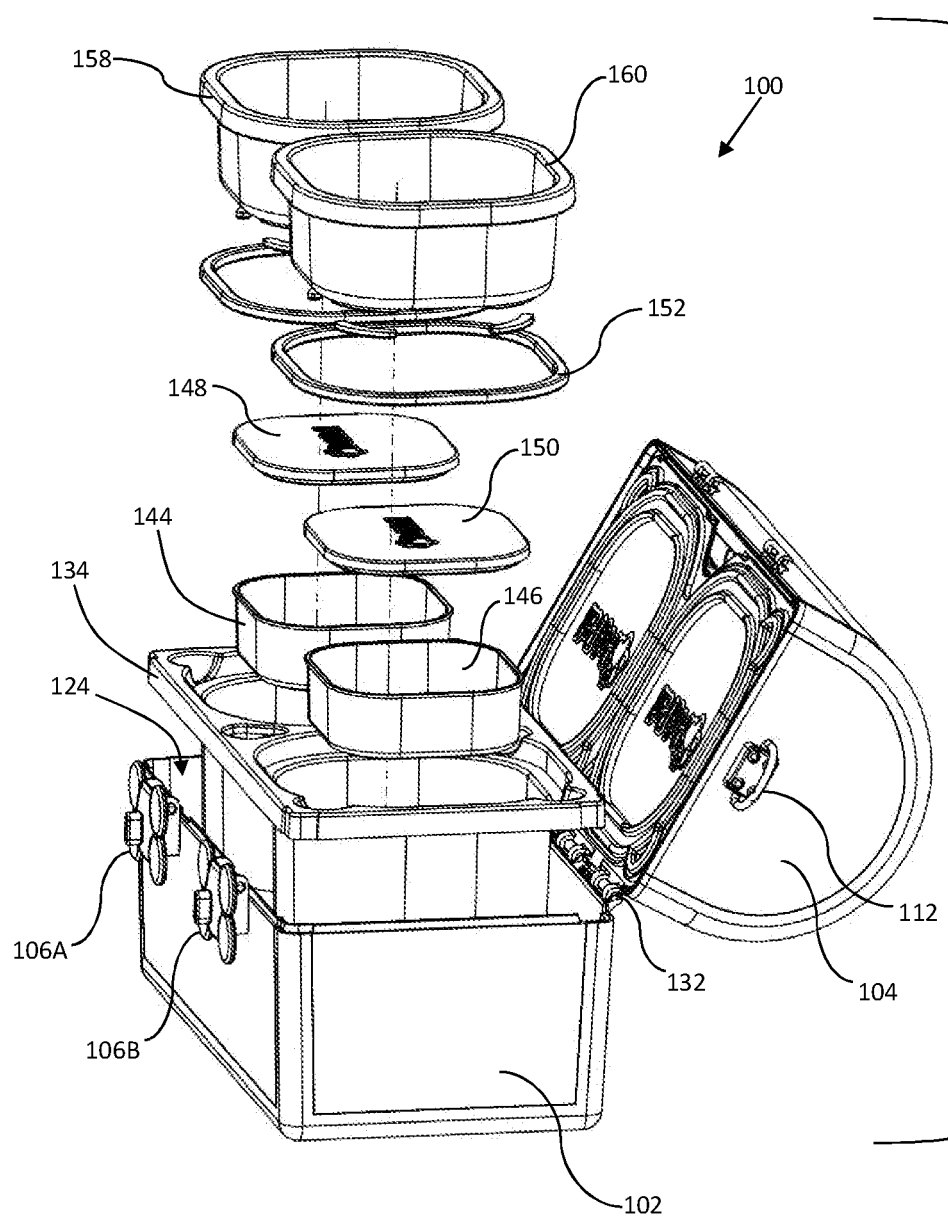
FIG. 11 is a perspective view illustrating various components nestable within the first compartment of a portable pet feeder and supply storage apparatus.
Figure 12:
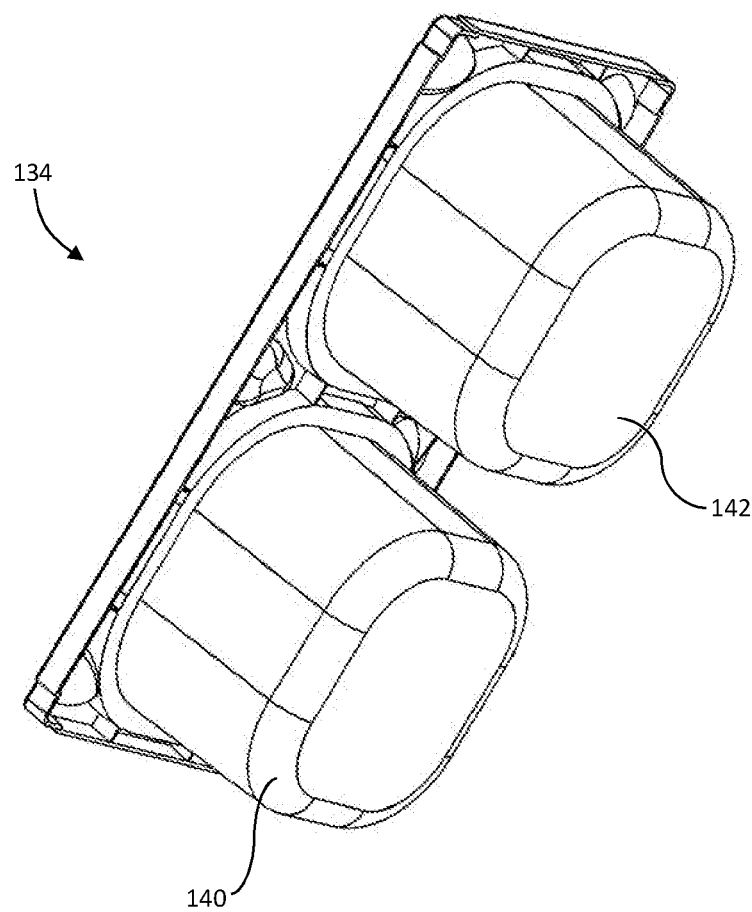
FIG. 12 is a bottom perspective view of a housing insert of a portable pet feeder and supply storage apparatus.
Figure 13:
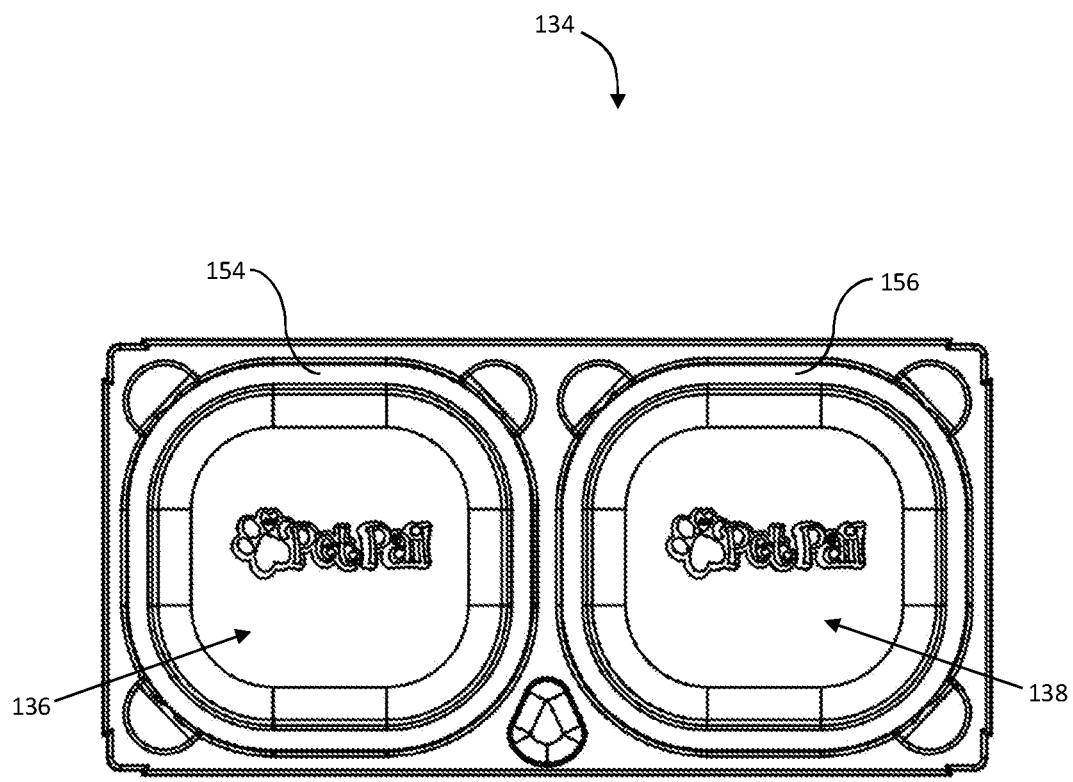
FIG. 13 is a top plan view of a housing insert of a portable pet feeder and supply storage apparatus.
Figure 14:
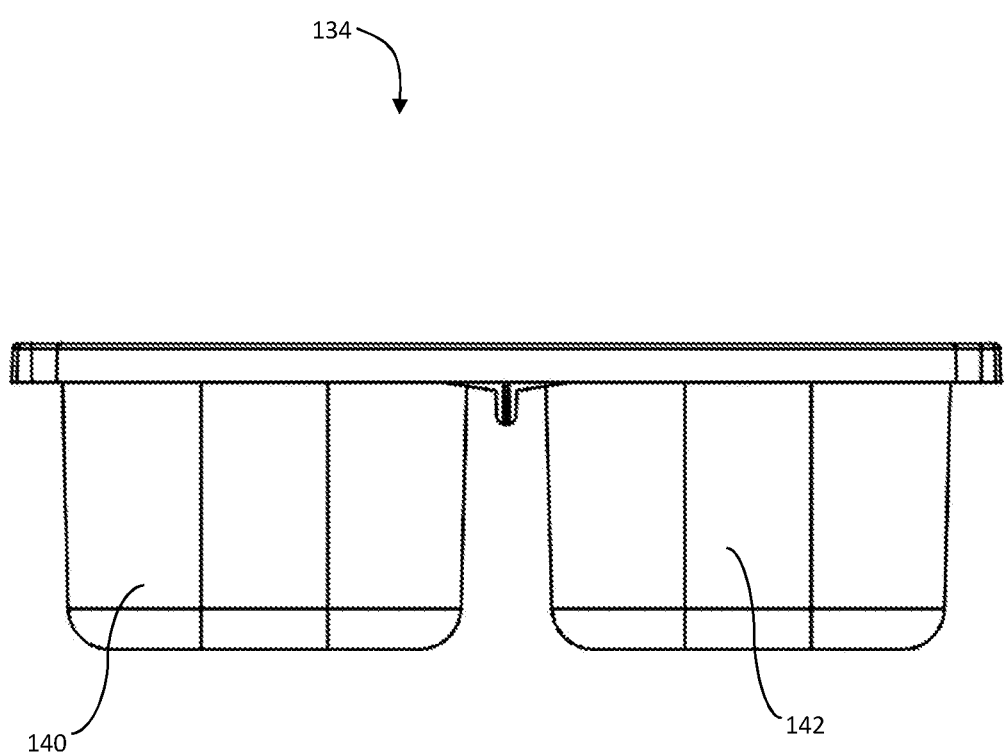
FIG. 14 is a front elevation view of a housing insert of a portable pet feeder and supply storage apparatus.
Figure 15:
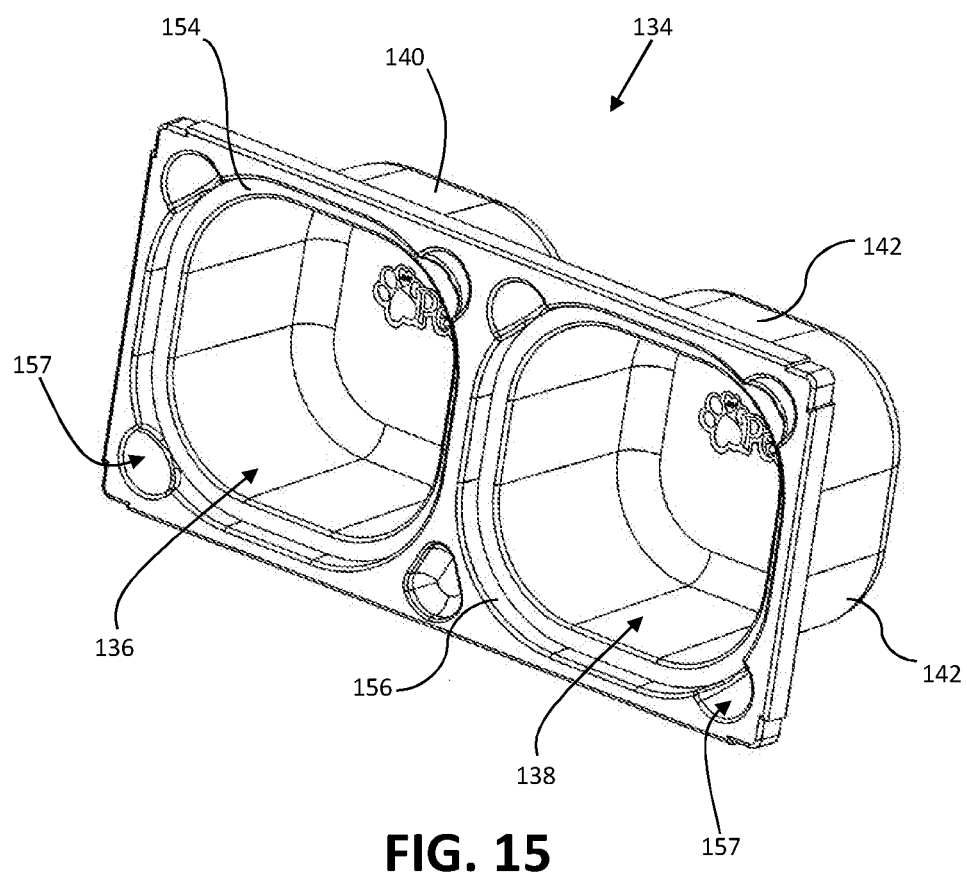
FIG. 15 is a top perspective view of a housing insert of a portable pet feeder and supply storage apparatus.

Referring to FIGS. 5-7, in one embodiment, the first compartment 102 comprises a base 120 and sidewalls 122 defining a first open space 124. Referring to FIGS. 8-10, in one embodiment, the second compartment 104 comprises a lid 126 and sidewalls 128 defining a second open space 130. Therefore, it is appreciated that when the first compartment 102 and the second compartment 104 are in the closed configuration (FIGS. 1-4), a hollow space is created therein, where items may be stored. Referring to FIG. 11, in one embodiment, the portable pet feeder and supply storage apparatus 100 is shown in an open configuration. As illustrated, the latches 106A and 106B have been released, allowing the second compartment 104 to pivot open from first compartment 102 via hinges 132. As shown, a variety of components may be received within the first open space 124. It will be appreciated that while the open space 124 is shown as generally rectangular, it may take any number of configurations. For example, it may be molded so as to conform to the shape of a water dish, food dish, or both. However, in another embodiment, a housing insert 134 may be used. As best shown in FIGS. 12-15, the housing insert 134 comprises a water dish opening 136 and a food dish opening 138 formed by descending sidewalls 140, 142. Referring back to FIG. 11, the housing insert 134 is nestable within the first open space 124. Once seated (nested) therein, one or more additional components may be placed and secured inside of the water dish opening 136 and food dish opening 138. In one embodiment, bowls 144, 146 may be stowed therein, and may have lids 148, 150 for securing the contents thereof. It will be appreciated that bowls 144, 146 are not required, and other items may be placed in their stead. For example, in hot climates, a user may place a cold pack within the water dish opening 136 so as to aid in keeping the water in water dish 158 colder (or may use a hot pack in colder weather). In either case, one or more lower dish gaskets 152 are then seated in a groove 154, 156 of the water dish opening 136 and food dish opening 138, respectively. A water dish 158 and food dish 160 may then be lowered into the water dish opening 136 and the food dish opening 138, resting atop the lids 148, 150, with the rim of each dish resting on the lower dish gaskets 152. The configuration is such that when fully seated (nested), the top of the water dish 158 and food dish 160 are flush with the rim of the first compartment 102. Access apertures 157 allow a user to easily insert their fingers to retrieve the water dish 158 and food dish 160. Access apertures 157 may be on one corner, or up to all four corners so as to make it easy for a user to retrieve the water dish 158 and food dish 160.

Figure 16:
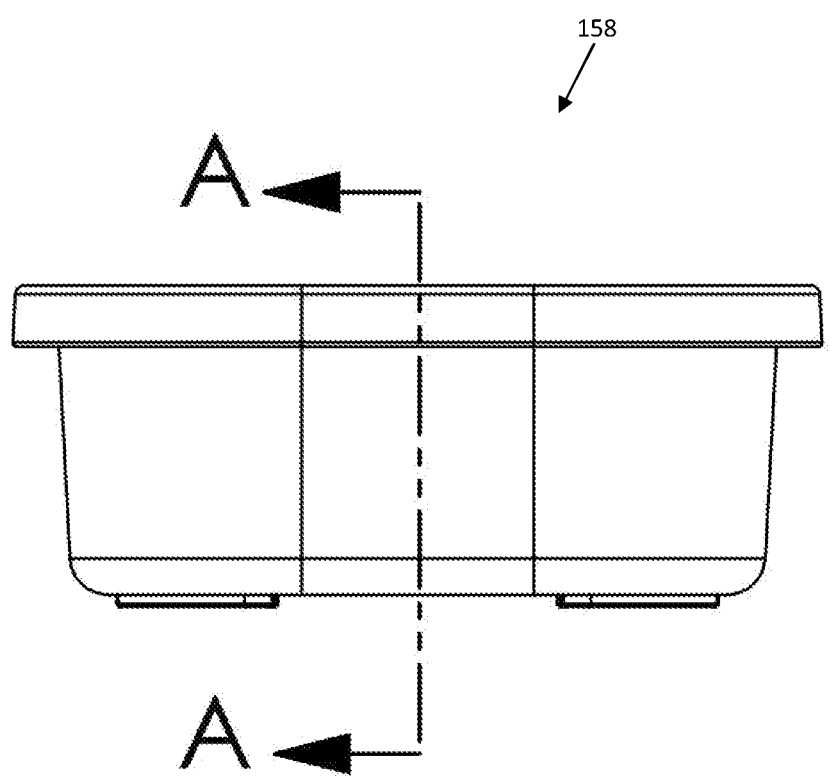
FIG. 16 is a side elevation view of a water dish of a portable pet feeder and supply storage apparatus.
Figure 17:
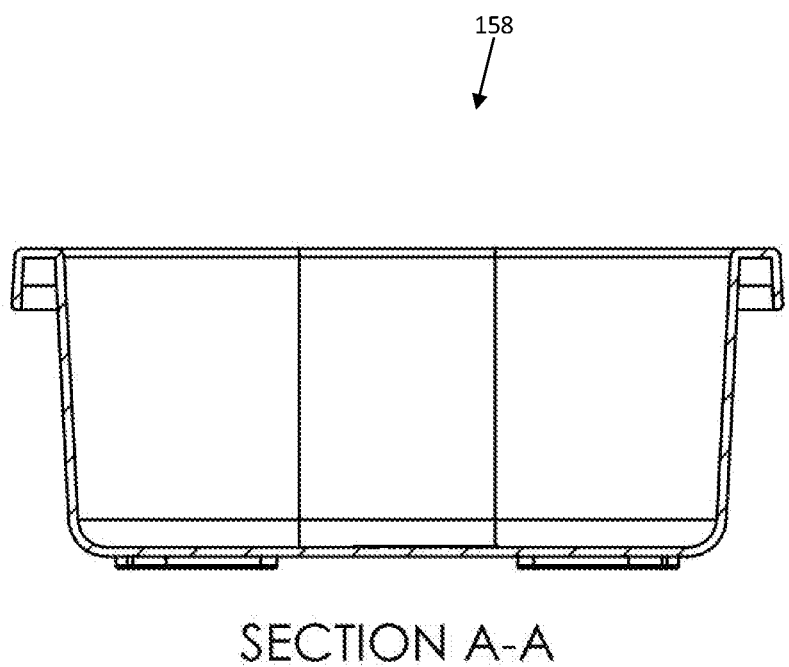
FIG. 17 is a cross-section along lines A-A of FIG. 16 of a water dish of a portable pet feeder and supply storage apparatus.
Figure 18:
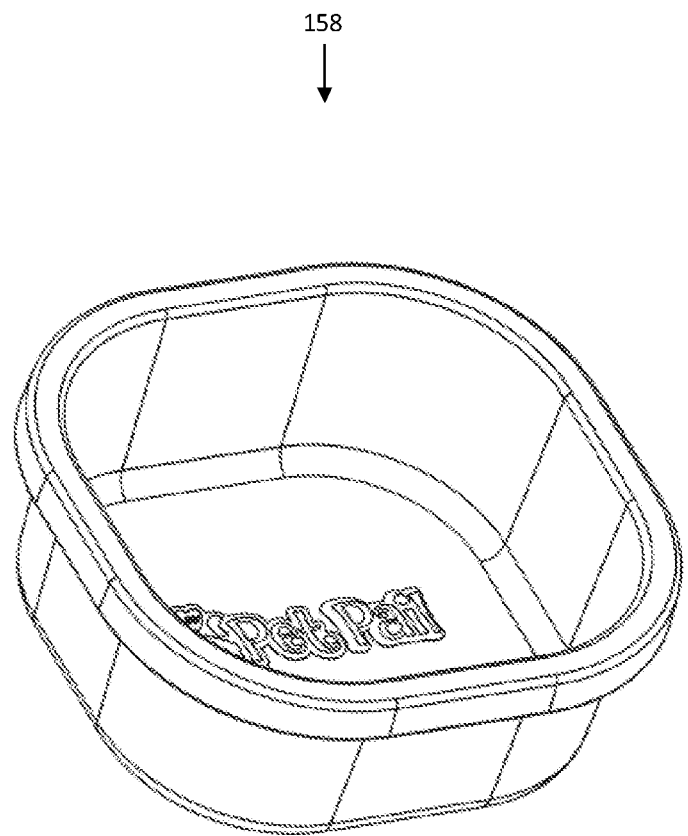
FIG. 18 is a perspective view of a water dish of a portable pet feeder and supply storage apparatus.
Figure 19:
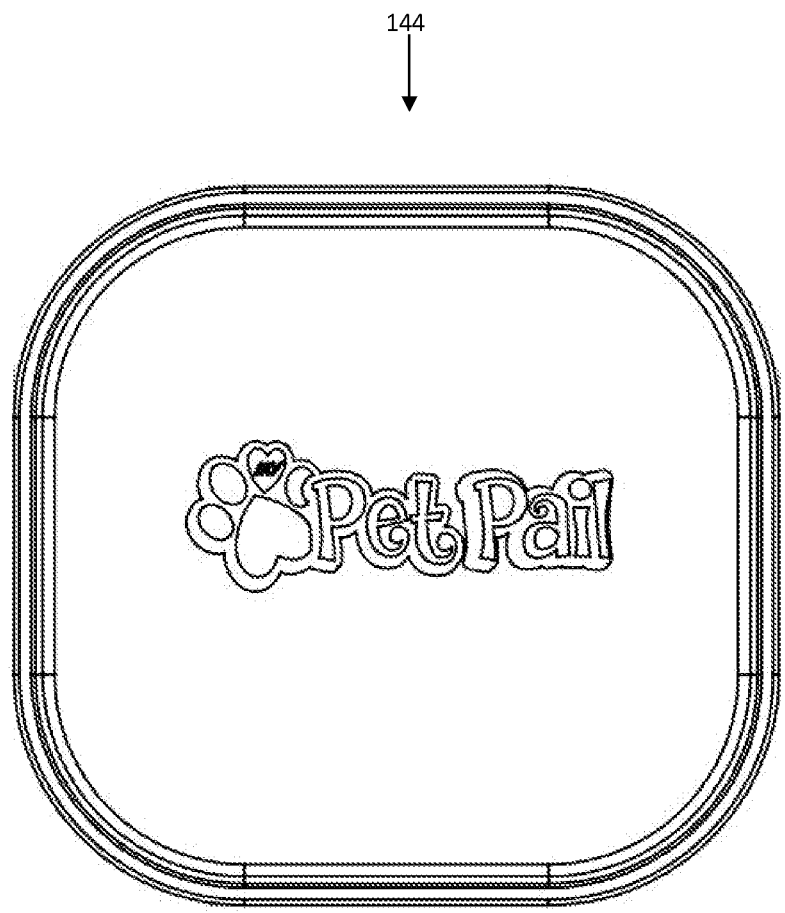
FIG. 19 is a top plan view of a bowl of a portable pet feeder and supply storage apparatus.
Figure 20:
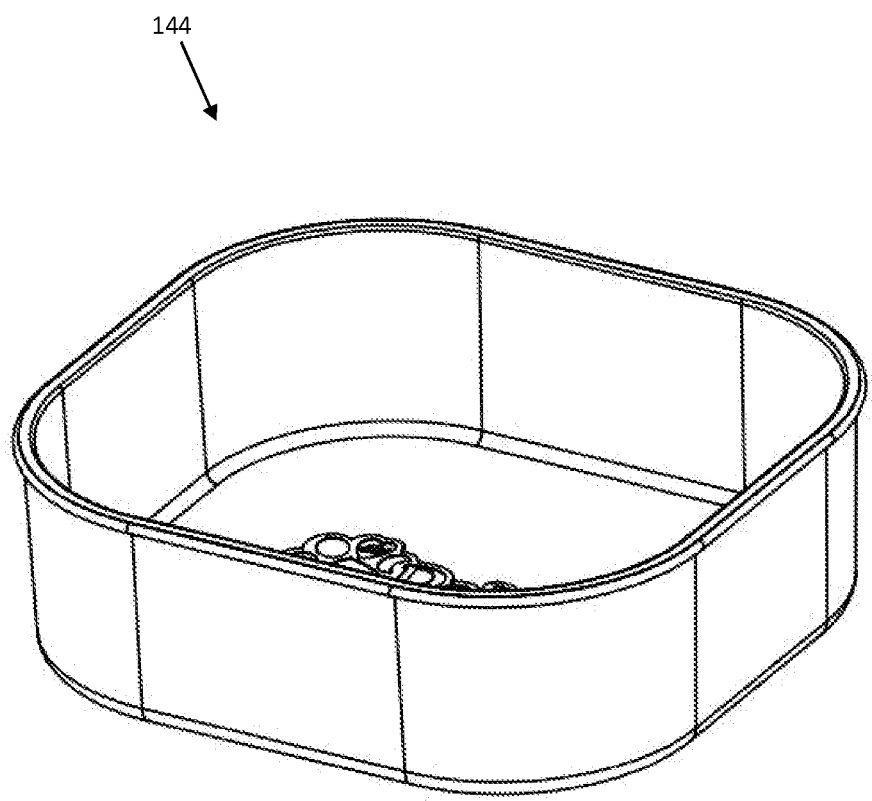
FIG. 20 is a perspective view of a bowl of a portable pet feeder and supply storage apparatus.
Figure 21:
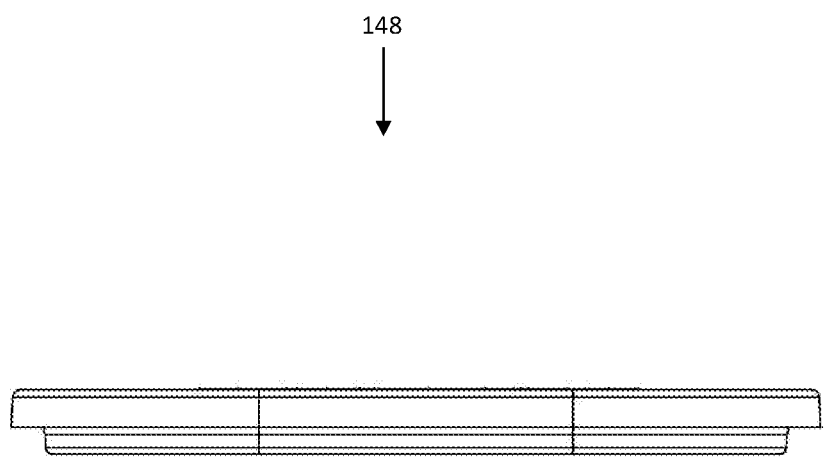
FIG. 21 is a side elevation view of a lid for a bowl of a portable pet feeder and supply storage apparatus.
Figure 22:
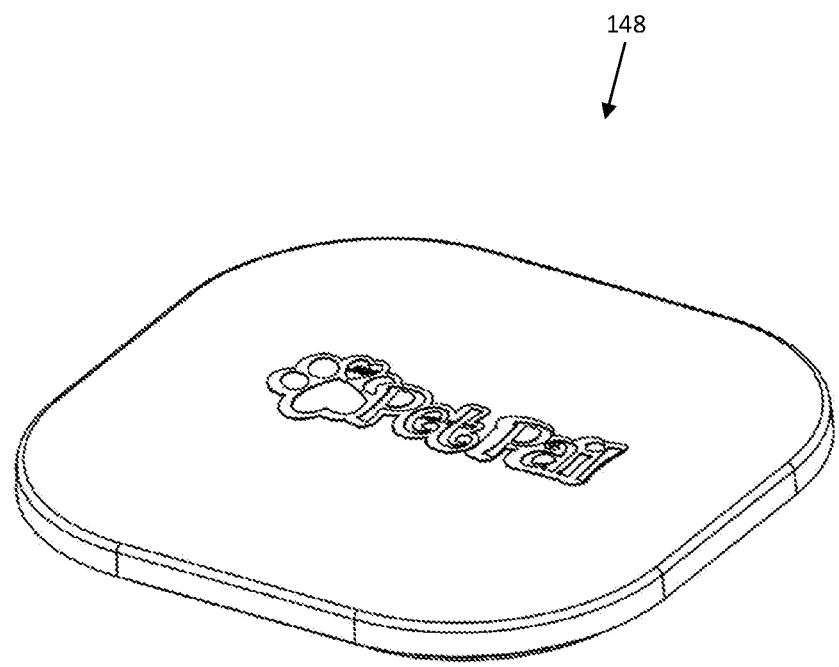
FIG. 22 is a perspective view of a lid for a bowl of a portable pet feeder and supply storage apparatus.

Several benefits are realized from the above configuration. For example, a user is able to store contents in a sealable bowl 144, 146, such as snacks, medicines, bandages, or anything else desired. Further, utilizing the housing insert 134 allows the internal configuration of the portable pet feeder and supply storage apparatus 100 to change. In other words, the housing insert 134 may be configured in different ways (e.g., one opening, three openings, etc.), allowing for customization by a user to fit their needs. FIGS. 16-22 illustrate the internal components described above in closer detail. FIG. 16 illustrates a side view of an open-faced water dish 158; FIG. 17 illustrates a section view along line A-A of FIG. 16; and FIG. 18 is a perspective view of the open-faced water dish 158. FIG. 19 illustrates a top plan view of bowl 144; FIG. 20 illustrates a plan view of bowl 144. FIG. 21 illustrates a side elevation view of lid 148; FIG. 22 illustrates a perspective view of lid 148. The water dish 158 and food dish 160 are preferably standard, open-faced dishes, providing easy access to food and water to the pet. As such, the water dish 158 and food dish 160 may be used as the daily method of feeding and watering the pet. Once a user desires to take a trip, the user may simply place the water dish 158 and food dish 160 in the water dish opening 136 and food dish opening 138 to transport them without spilling. This is extremely convenient for a user.

Figure 23:
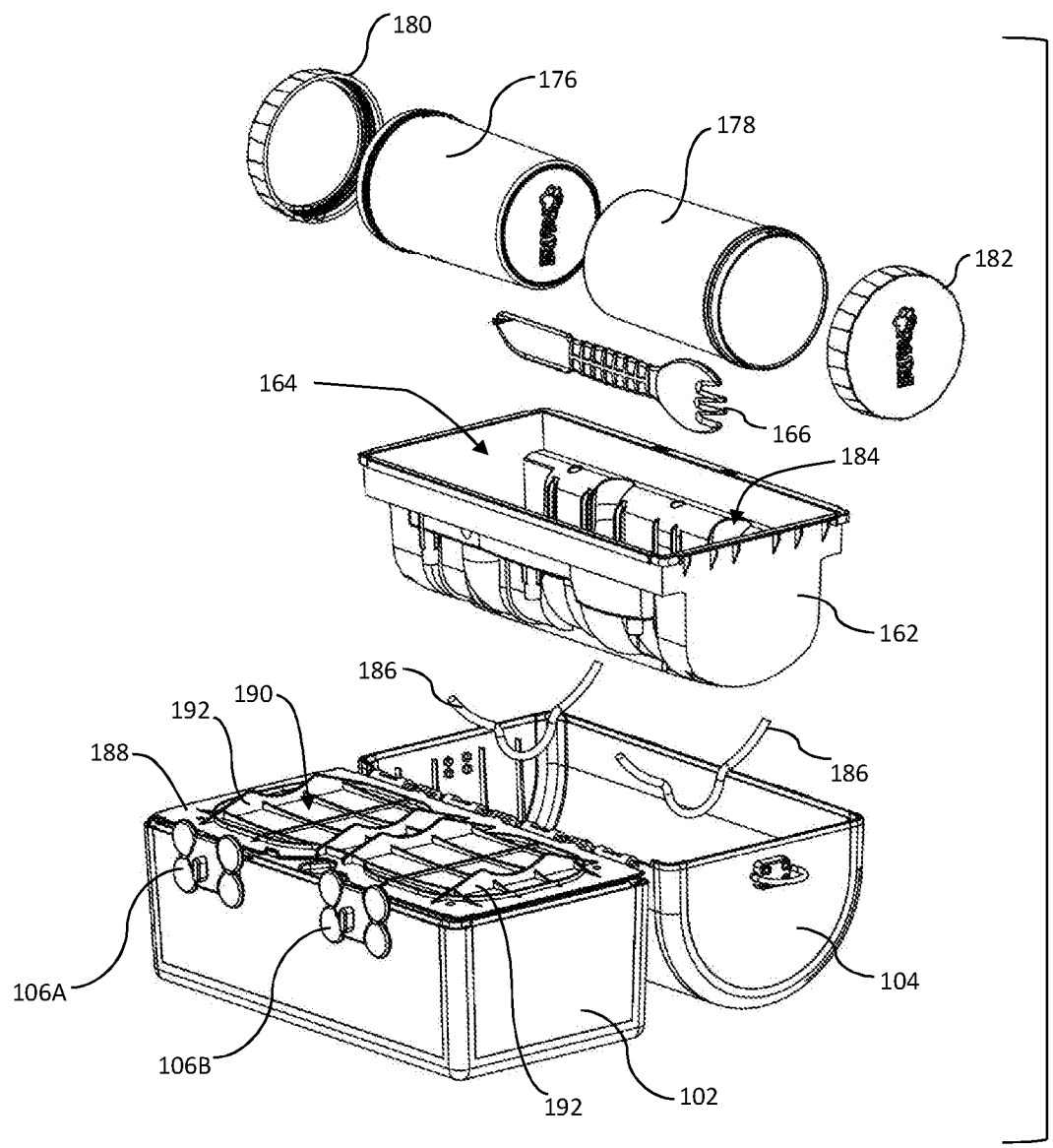
FIG. 23 is a perspective view illustrating various components nestable within the second compartment of a portable pet feeder and supply storage apparatus.
Figure 24:
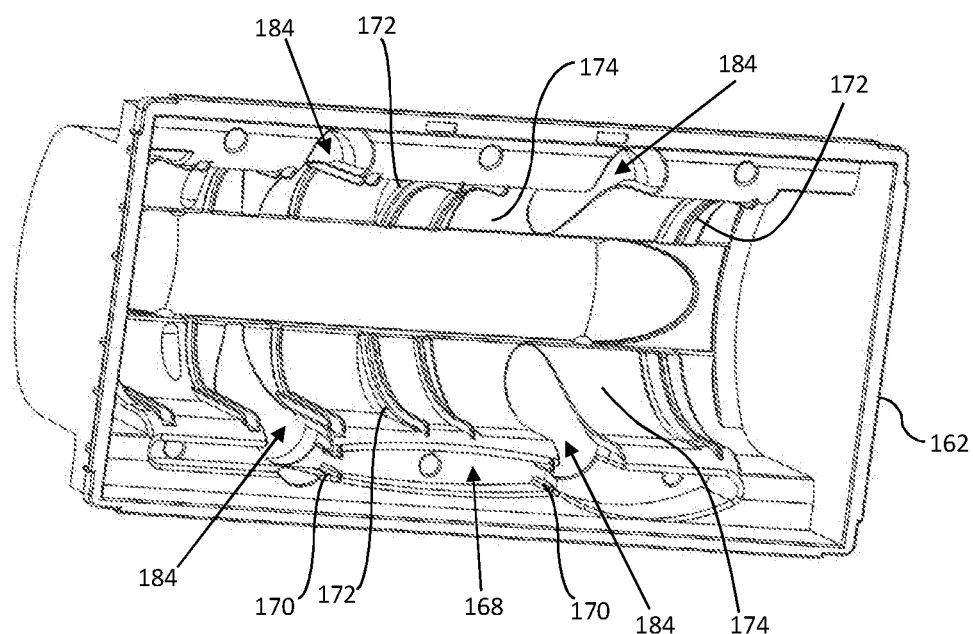
FIG. 24 is a perspective top view of a lid insert of a portable pet feeder and supply storage apparatus.
Figure 25:
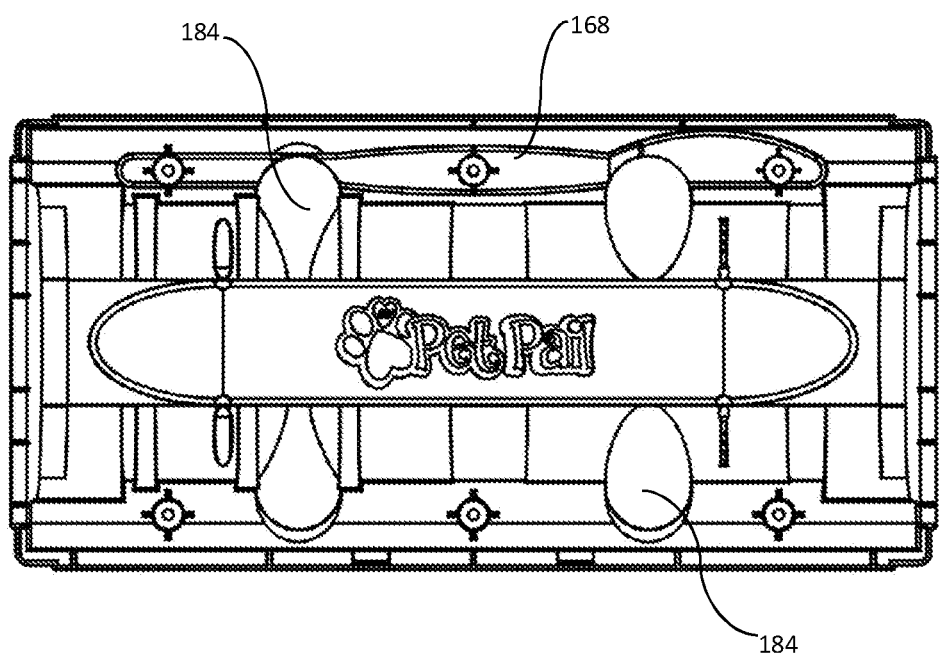
FIG. 25 is a top plan view of a lid insert of a portable pet feeder and supply storage apparatus.
Figure 26:
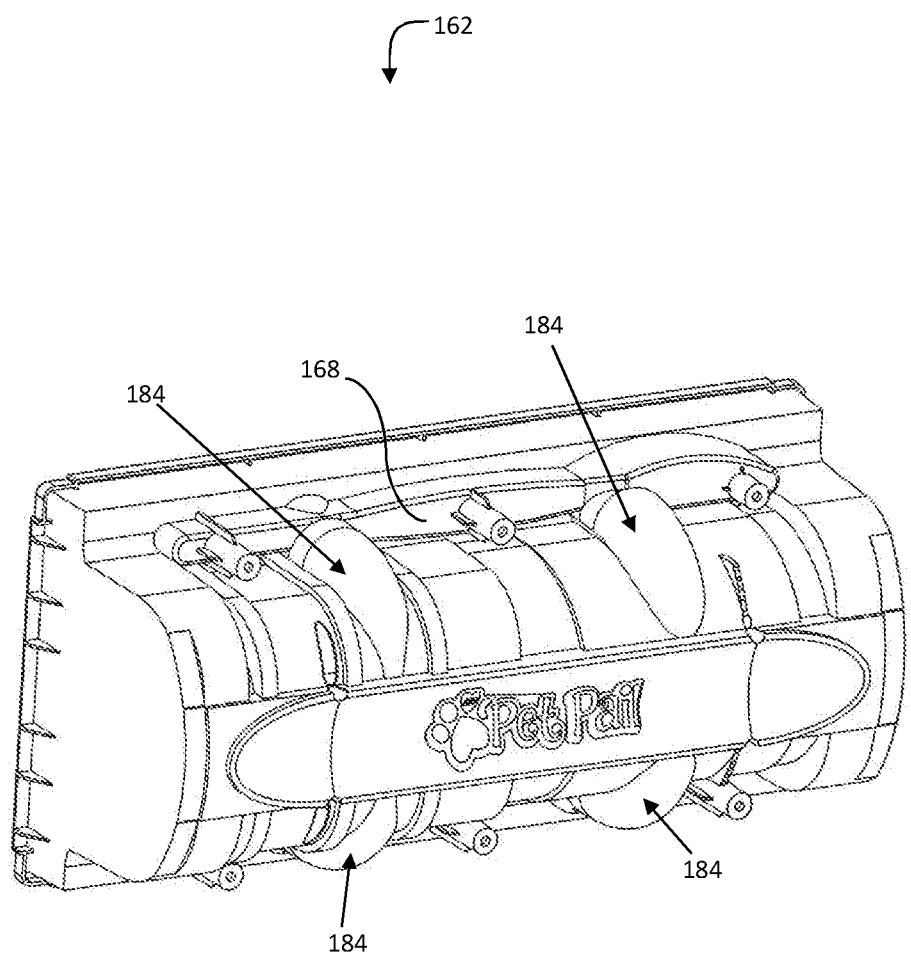
FIG. 26 is a bottom perspective view of a lid insert of a portable pet feeder and supply storage apparatus.
Figure 27:
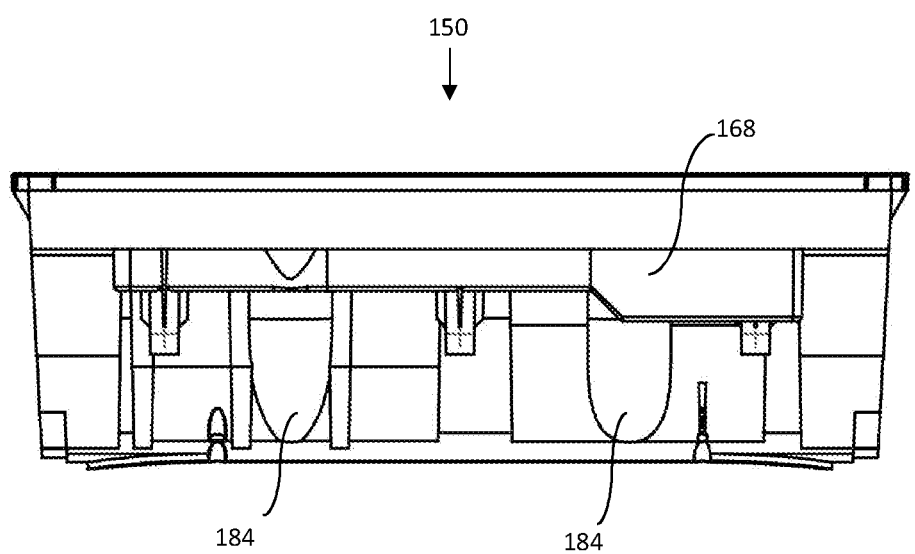
FIG. 27 is a side elevation view of a lid insert of a portable pet feeder and supply storage apparatus.

Referring now to FIG. 23, in one embodiment, various internal components are shown that are receivable within the second open space 130. Similar to the configuration of the housing insert 134 and the first compartment 102, a lid insert 162 may be nestable within the second open space 130. Lid insert 162 is complementary in shape to the second compartment 104 and comprises an open space 164 for receiving and storing various components. In one non-limiting example, a utensil 166 may be secured to the inner sidewall of the lid insert 162. As best seen in FIGS. 24-25, the utensil 166 may be secured in a utensil groove 168 with tension tongues 170. The inner sidewalls of lid insert 162 may have a plurality of ribs 172 and grooves 174 shaped so as to complement one or more sealable containers 176, 178 (referring back to FIG. 23). As seen in FIG. 26 and others, the sidewalls of the lid insert 162 form the utensil groove 168 and finger apertures 184. Each sealable container 176, 178 having a threadable lid 180, 182. The sealable containers 176, 178 may be secured within the lid insert 162 via the tension created by the ribs 172. Finger apertures 184 allow a user to easily grasp and remove the removable containers 176, 178, with semi-rigid cable 186 optionally being used to form loops 118 for securing the handle 114. As further shown in FIG. 23, a divider 188 separates the contents of the first compartment 102 and the second compartment 104. The first side (not shown in this view) encloses the contents of the first compartment 102, while the second side 190 selectively encloses the contents of the second compartment 104. As illustrated, the second side 190 may have divider ribs 192 complementary to the shape of the sealable containers 176, 178, allowing the divider 188 to aid in preventing movement of the sealable containers 176, 178 within the portable pet feeder and supply storage apparatus 100. The divider 188 functions as a compartment separator, component securer (securing the sealable containers 176, 178), and as a food and liquid seal (discussed further below).

Figure 28:
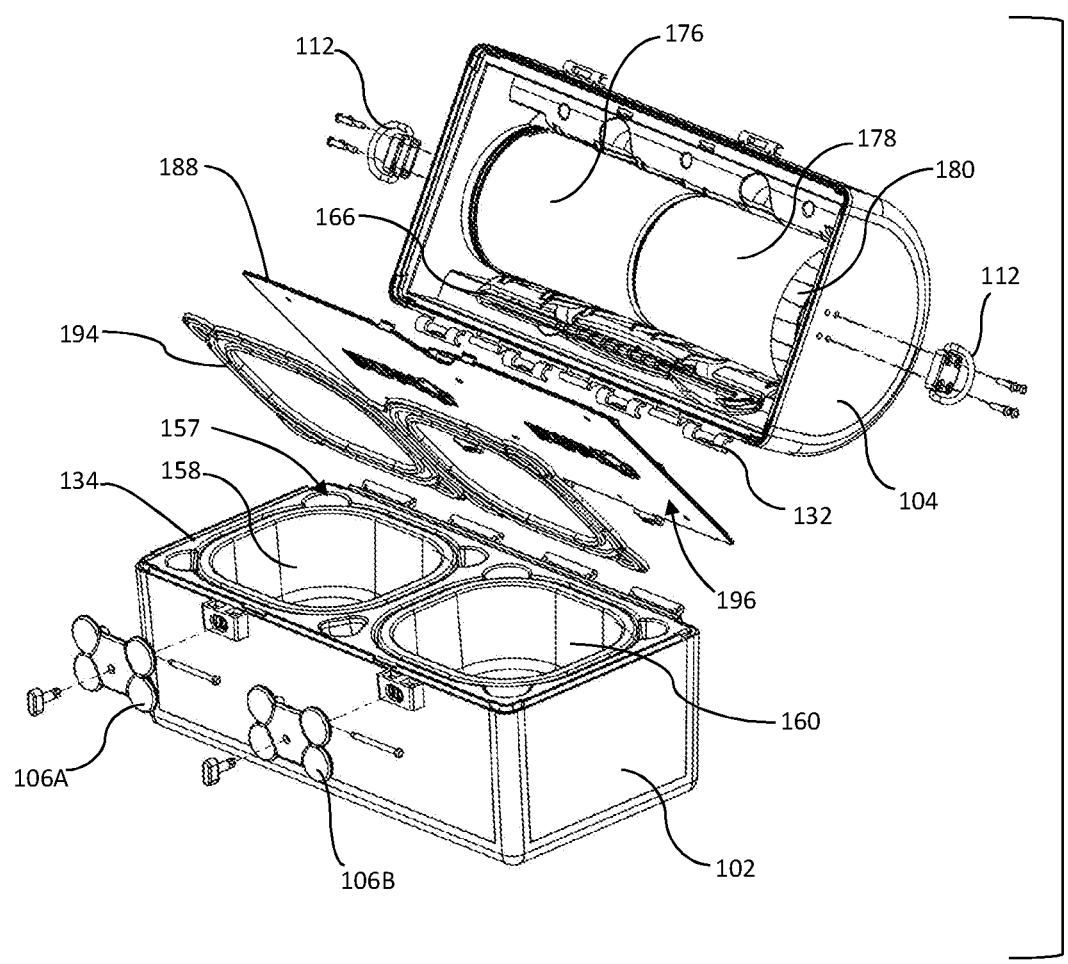
FIG. 28 is an open view illustrating a divider and gasket and other components of a portable pet feeder and supply storage apparatus.

In one embodiment, a divider 188 is interposed between the first compartment 102 and second compartment 104, wherein the second compartment 104 and the divider 188 are hinged to the first compartment 102. As best seen in FIG. 28, the divider 188 comprises an upper dish gasket 194 on a first side 196. The second compartment 104 and the divider 188 may be pivoted towards the first compartment 102 on hinges 132 to assume a closed position (FIGS. 1-4). When closed, the lower dish gaskets 152 and upper dish gaskets 194 provide a water-tight seal between the water dish 158 and food dish 160 and the divider 188. Due to the divider ribs 192 on the second side 190 of the divider 188 and the upper dish gasket 194 on a first side 196 of the divider 188, the contents inside of the portable pet feeder and supply storage apparatus 100 are prevented from moving and leaking. As such, a user may transport open-faced water dishes 158 and food dishes 160 within the portable pet feeder and supply storage apparatus 100 without leaking.

In one example of use, a user would fill sealable container 176 with water and sealable container 178 with food. The user would then "snap" them into place (tension from the ribs 172) within the lid insert 162. The lid insert 162 may be secured within the second compartment 104 using bolts, screws, or equivalent. A user could then pivot the divider 188 to access the first compartment 102. The user could then remove the water dish 158 and food dish 160 so as to access the contents below, such as the bowls 144, 146. Once the water dish 158 and food dish 160 have been reinserted in the housing insert 134, the user again pivots the divider 188 so that the upper dish gasket 194 engages the rim of both the water dish 158 and food dish 160. In other words, the upper dish gasket 194 is configured to engage the entire rim circumference of both the water dish 158 and food dish 160. The user may then pivot the second compartment 104 towards the first compartment 102, whereupon the second compartment 104 engages the divider 188. With the divider 188 securely interposed between the first compartment 102 and the second compartment 104, one or more latches 106A, 106B may be used to tighten the seal and ensure that the portable pet feeder and supply storage apparatus 100 remains closed. With the portable pet feeder and supply storage apparatus 100 in the closed position, a user may transport its contents without fear of leaking or spilling. When a user desires to give access to the food and/or water therein, the user simply releases the latches 106A, 106B, pivots the second compartment 104 and divider 188 away from the first compartment 102, which provides access to the open water dish 158 and food dish 160. If desired, a user may even remove the water dish 158 and food dish 160 from the portable pet feeder and supply storage apparatus 100 so as to allow easier access to the food and water for smaller animals. The ability to transport an open water dish 158 and an open food dish 160, simultaneously, has not been achieved by the prior art. In one embodiment, the second compartment 104 and the divider 188 may be disconnected from the first compartment 102 (e.g., such as using an open-faced hinge system, as shown), allowing a user to use the first compartment 102 and associated components described above for daily animal sustenance care. In this way, when a user desires to take a trip, the user simply needs to reattach the divider 188 and the second compartment 104, latch them together, and is ready to leave. Again, such simplicity is not found in the prior art. The user may easily place the portable storage container in a vehicle, backpack, or may simply carry it by the collar/handle 114 or leash/shoulder strap 108.

Additional benefits may be included herein. For example, in one embodiment, a bag space may be defined along the rear of the first opening 124 when the housing insert 134 is inserted into the first opening 124. This bag space may be formed by the contoured space between the water dish opening 136 and food dish opening 138. This space may be sized so as to receive a small roll of waste disposal bags. Further, an axle may extend downwardly from the housing insert into the bag space, which allows a roll of bags to rotate thereon. As best seen in FIGS. 5 and 7, a bag access port 198 provides access for a user to be able to grasp a bag from within the bag space and extract it therefrom. The bag access port 198 may have a configuration known to aid in separating perforated bags as well, such as one or more side protrusions.

While the above examples and the Figures generally show multiple components being stored in the portable pet feeder and supply storage apparatus 100, it will be appreciated that any number of accessories may, or may not, be provided therein. In one embodiment, the portable pet feeder and supply storage apparatus comprises as little as a first compartment 102 with a water dish 158 and food dish 160 receivable therein, a divider 188 with an upper dish gasket 194, and a second compartment 104. No inserts, dishes, or other items required. In such an instance, a user may easily transport open faced, filled dishes of food and water without spilling.

It will be understood that the various embodiments disclosed herein are not only ideal for pet owners, but may also be used by emergency personnel and pet rescuers. For example, emergency personnel may carry the portable pet feeder and supply storage apparatus 100 in their vehicle, such that when an animal is encountered in an emergency or recovery situation, the responder has everything needed: collar, leash, food, water, first aid supplies, or any number of items. The removable water dish 158 and food dish 160 allow a user to easily get sustenance to the animal in need of care.

Figure 29:
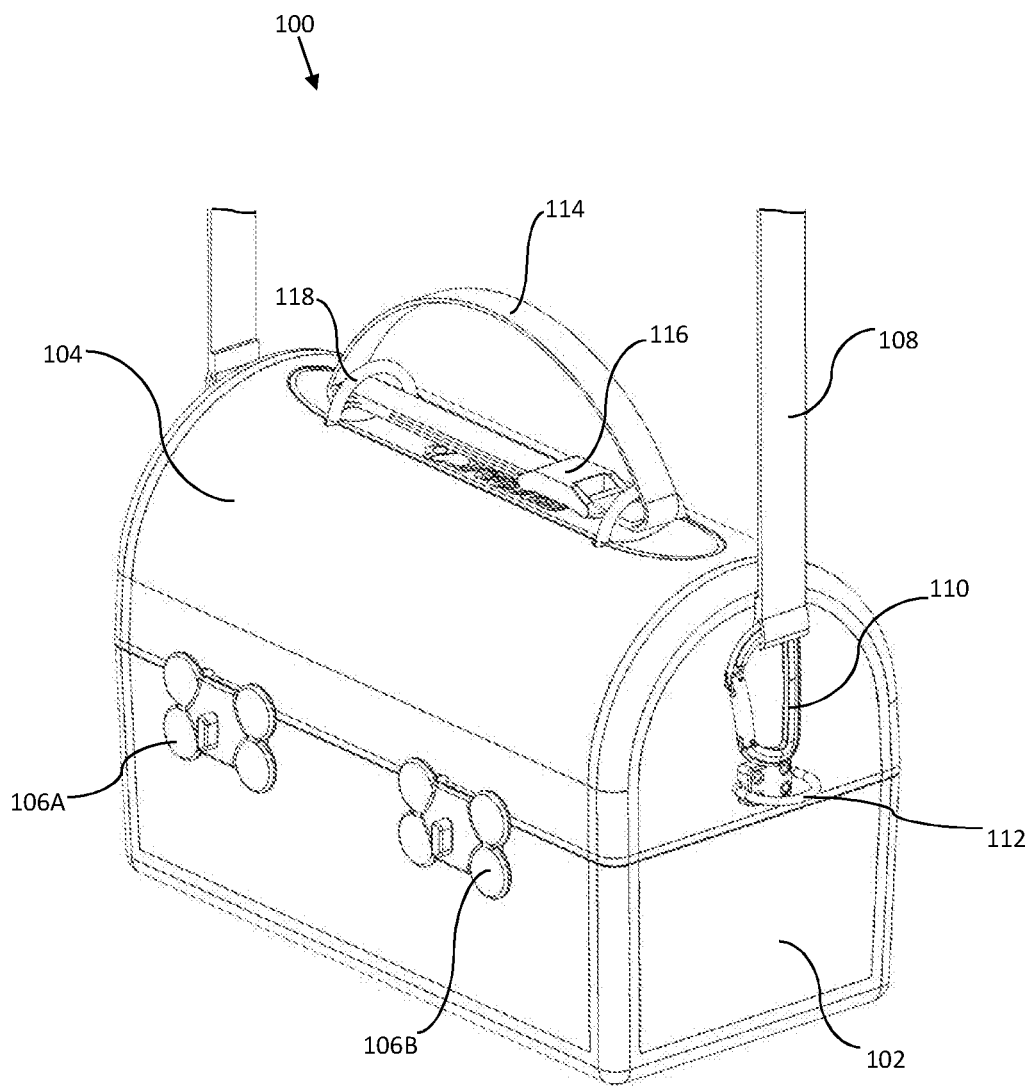
FIG. 29 is a detailed view of a collar as a handle of a portable pet feeder and supply storage apparatus.
Figure 30:
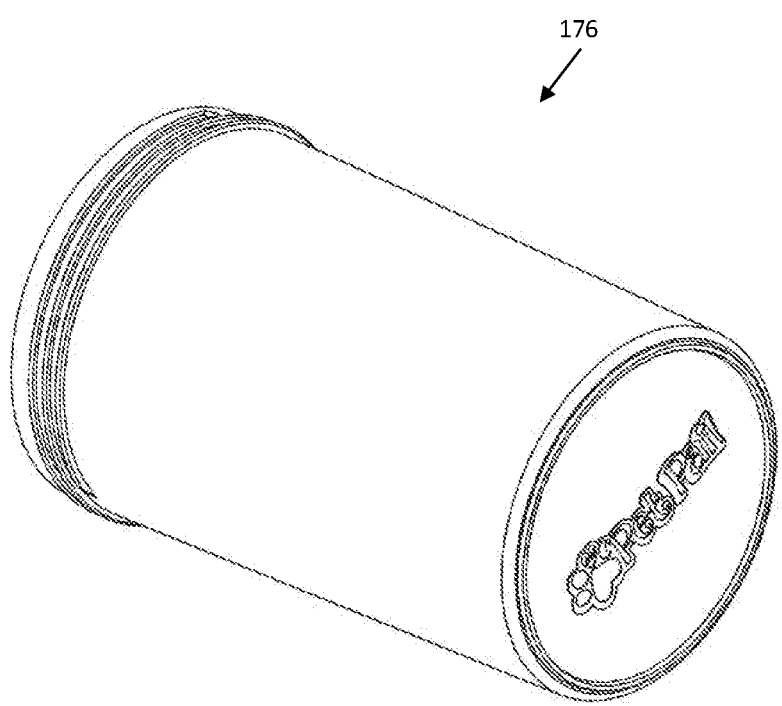
FIG. 30 is a perspective view of a sealable container of a portable pet feeder and supply storage apparatus.
Figure 31:
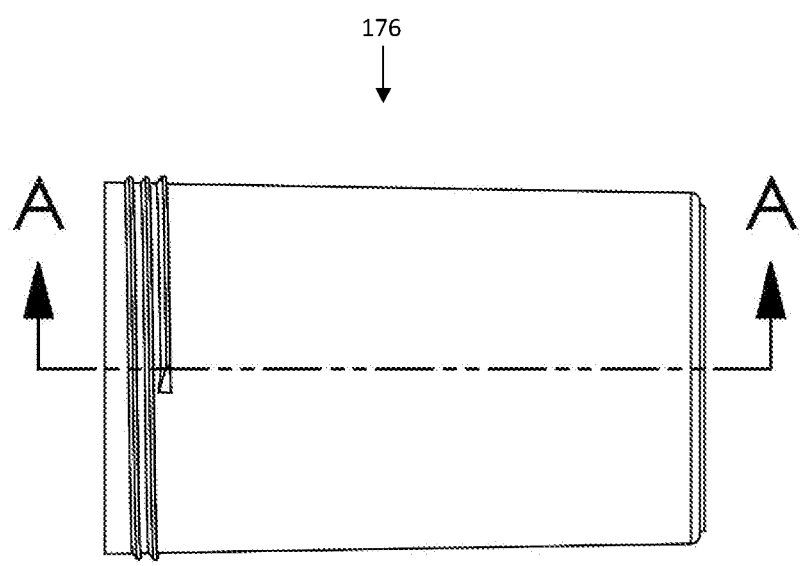
FIG. 31 is a side elevation view of a sealable container of a portable pet feeder and supply storage apparatus.
Figure 32:
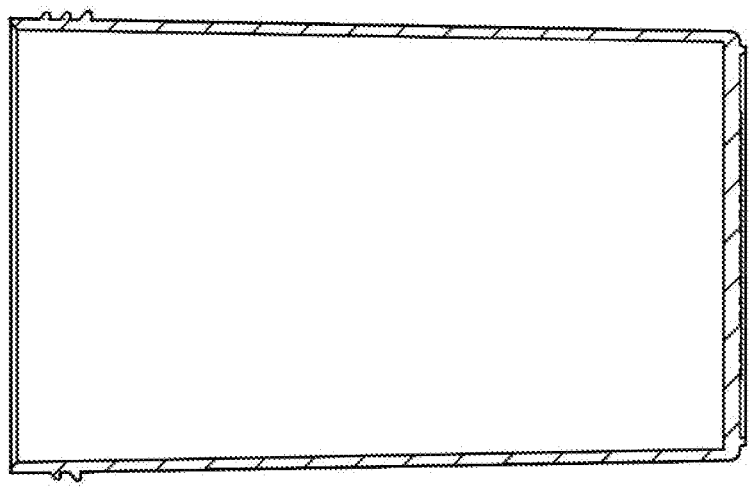
FIG. 32 is a cross-section along lines A-A of FIG. 31 of a sealable container of a portable pet feeder and supply storage apparatus.
Figure 33:
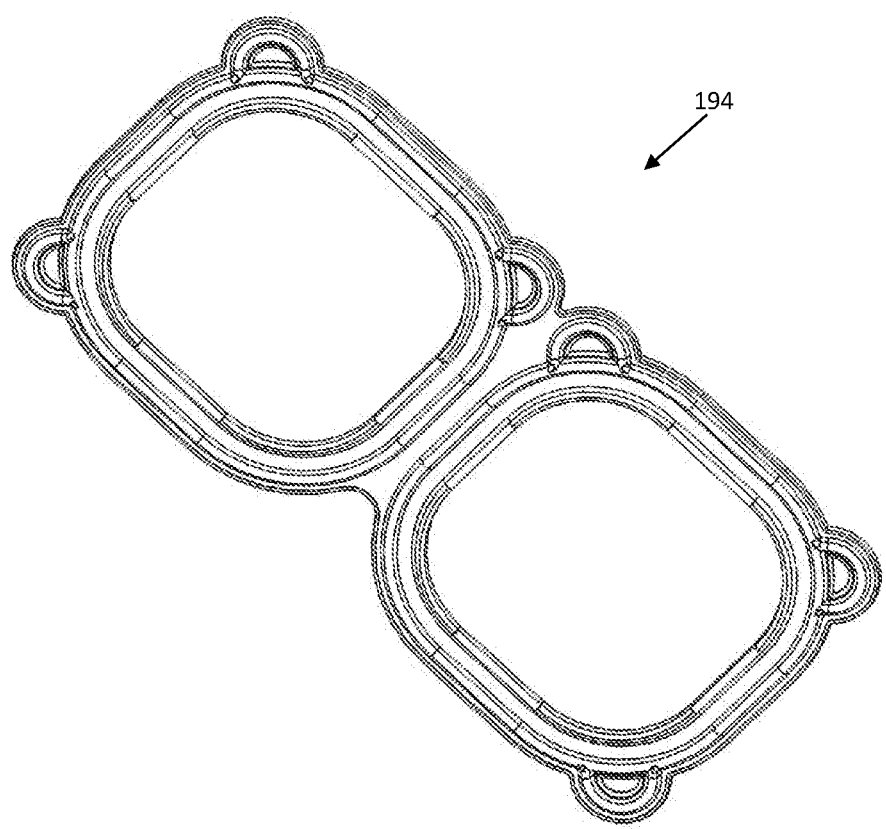
FIG. 33 is a perspective view of an upper dish gasket of a portable pet feeder and supply storage apparatus.
Figure 34:
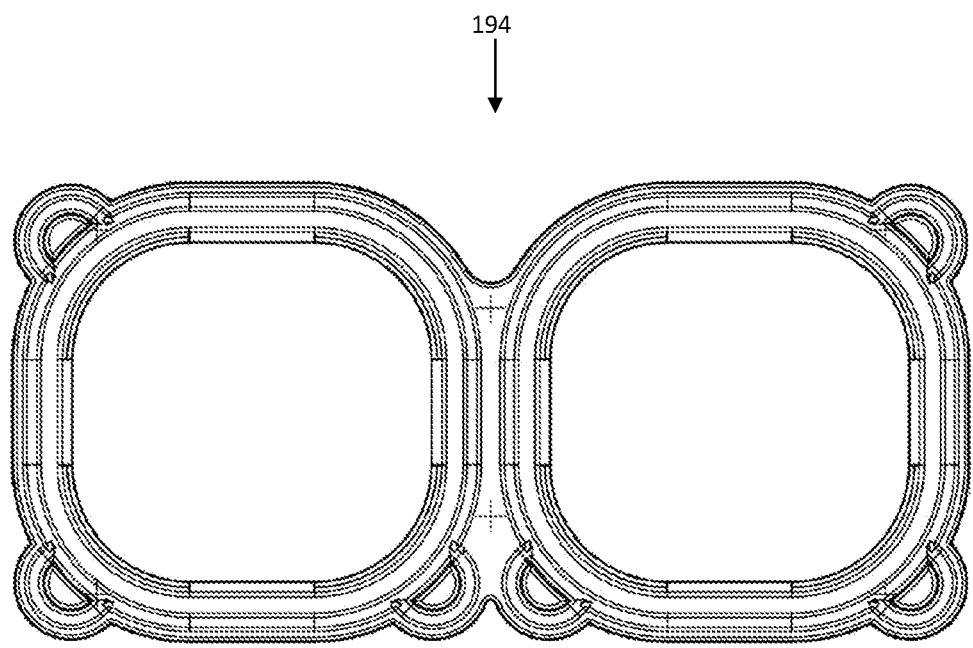
FIG. 34 is a top plan view of an upper dish gasket of a portable pet feeder and supply storage apparatus.
Figure 35:
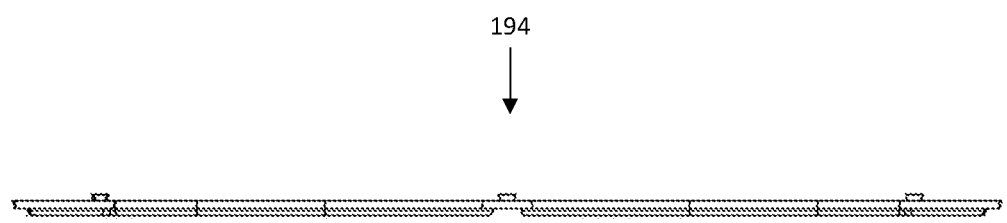
FIG. 35 is a side elevation view of an upper dish gasket of a portable pet feeder and supply storage apparatus.
Figure 36:
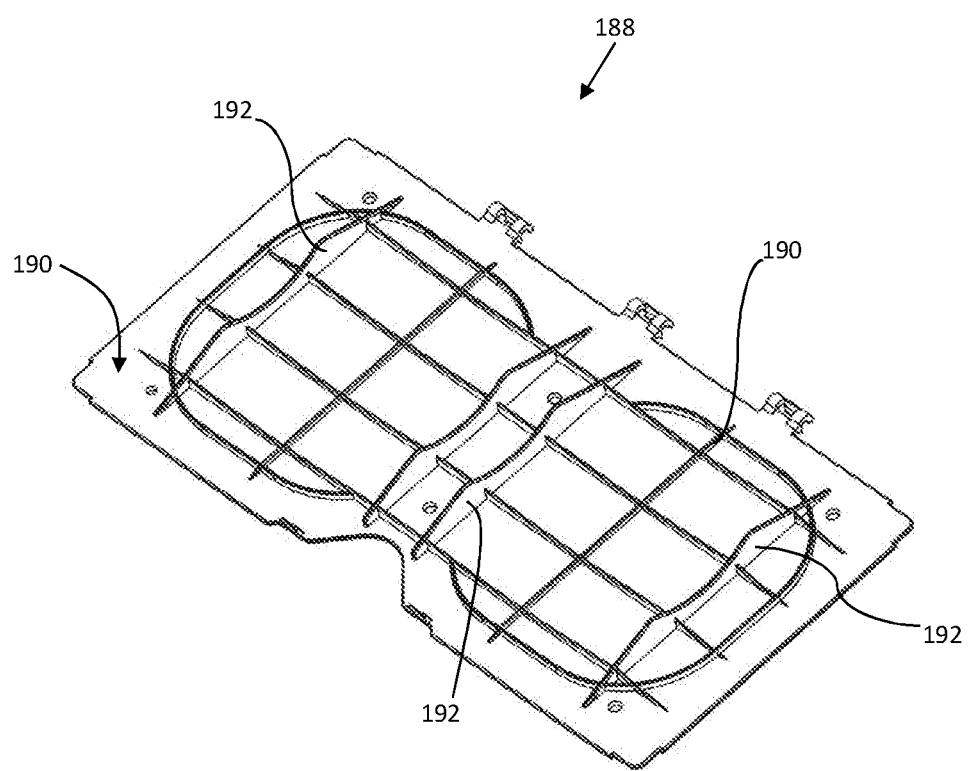
FIG. 36 is a perspective view of a divider of a portable pet feeder and supply storage apparatus.
Figure 37:
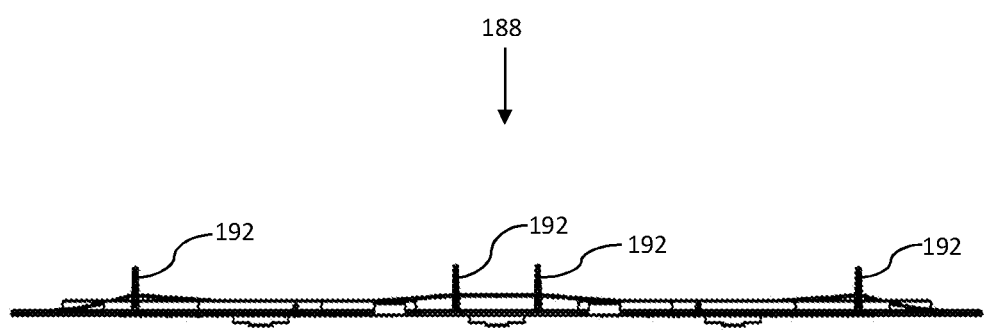
FIG. 37 is a front elevation view of a divider of a portable pet feeder and supply storage apparatus.
Figure 38:
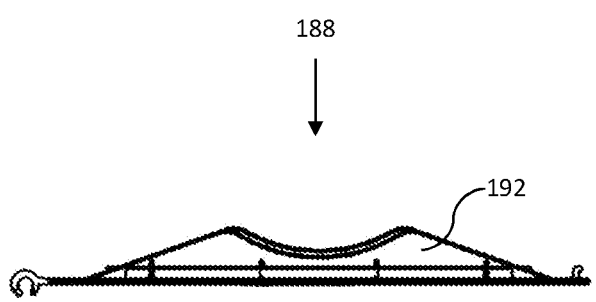
FIG. 38 is a side elevation view of a divider of a portable pet feeder and supply storage apparatus.

FIGS. 29-38 illustrate various components of the portable pet feeder and supply storage apparatus in greater detail. FIG. 29 is a detailed view of a collar as a handle of a portable pet feeder and supply storage apparatus; FIG. 30 is a perspective view of a sealable container of a portable pet feeder and supply storage apparatus; FIG. 31 is a side elevation view of a sealable container of a portable pet feeder and supply storage apparatus; FIG. 32 is a cross-section along lines A-A of FIG. 31 of a sealable container of a portable pet feeder and supply storage apparatus; FIG. 33 is a perspective view of an upper dish gasket of a portable pet feeder and supply storage apparatus; FIG. 34 is a top plan view of an upper dish gasket of a portable pet feeder and supply storage apparatus; FIG. 35 is a side elevation view of an upper dish gasket of a portable pet feeder and supply storage apparatus; FIG. 36 is a perspective view of a divider of a portable pet feeder and supply storage apparatus; FIG. 37 is a front elevation view of a divider of a portable pet feeder and supply storage apparatus; and FIG. 38 is a side elevation view of a divider of a portable pet feeder and supply storage apparatus.

It is appreciated from the foregoing that the portable pet feeder and supply storage apparatus described herein solves the need for a portable storage device for pet supplies, including the ability to carry food and water without spillage or leaking, as well as other accessories.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention as defined in the appended claims. Additionally, it is not intended that the scope of patent protection afforded the present invention be defined by reading into any claim a limitation found herein that does not explicitly appear in the claim itself.

What is claimed is:

1. A portable pet feeder and supply storage apparatus, comprising:
    a first compartment having a base and sidewalls defining a first open space;
    a second compartment having a lid and sidewalls defining a second open space;
    a divider interposed between the first and second compartments, wherein the second compartment and the divider are hinged to the first compartment, the divider comprising a gasket;
    wherein the second compartment and the divider may be pivoted towards the first compartment to assume a closed position, the gasket on the divider providing a water-tight seal between the first compartment and the divider;
    a water dish and a food dish both removably insertable within the first open space;
    at least one removable container receivable within the second open space, the removable container configured to be refillable and water-tight; and
    wherein the second compartment and the divider are removably attachable to the first compartment;
    a housing insert configured to be nestable within the first compartment, the housing insert comprising a water dish opening and a food dish opening for receiving the water dish and food dish;
    wherein when the housing insert and the first compartment are nested together, a bag aperture is formed, the first compartment further comprising an access aperture in a least one sidewall for accessing the bag aperture, the bag aperture housing a plurality of bags.

2. The portable pet feeder and supply storage apparatus of claim 1, further comprising two bowls, each having a removable lid, each bowl being removably insertable within the water dish opening and food dish opening and configured so that when nested within the food dish opening and the water dish opening, the food dish and water dish may be received within the food dish opening and water dish opening, the food dish and water dish resting on the lids of the bowls; the food dish and water dish having a rim for resting in a groove around the circumference of the food dish opening and water dish opening so that the food dish and water dish nest flush with the housing insert, the groove having a gasket therein.

3. The portable pet feeder and supply storage apparatus of claim 1, further comprising a lid insert configured to be nestable within the second compartment, the lid insert comprising at least one opening for receiving the removable container, the lid insert being securable to the second compartment.

4. The portable pet feeder and supply storage apparatus of claim 1, further comprising a collar for use as a handle, the collar being removably secured to the top side of the second compartment using at least one securing ring.

5. The portable pet feeder and supply storage apparatus of claim 1, further comprising a leash for use as a shoulder strap, the leash being removably secured to either the first or second compartment using at least one securing ring.

6. The portable pet feeder and supply storage apparatus of claim 1, wherein the divider comprises a plurality of ridges in shape complementary to the removable container so as to prohibit movement of the container when the ridges are proximal to the removable container.

7. The portable pet feeder and supply storage apparatus of claim 1, further comprising a utensil, the utensil securable in a utensil aperture in the lid insert.

* * * * *